United States Patent
Kato et al.

(10) Patent No.: US 11,136,027 B2
(45) Date of Patent: Oct. 5, 2021

(54) VEHICLE CONTROL DEVICE

(71) Applicant: HONDA MOTOR CO., LTD., Tokyo (JP)

(72) Inventors: Daichi Kato, Wako (JP); Hiroshi Oguro, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 40 days.

(21) Appl. No.: 16/616,093

(22) PCT Filed: May 25, 2017

(86) PCT No.: PCT/JP2017/019591
§ 371 (c)(1),
(2) Date: Nov. 22, 2019

(87) PCT Pub. No.: WO2018/216177
PCT Pub. Date: Nov. 29, 2018

(65) Prior Publication Data
US 2020/0172100 A1     Jun. 4, 2020

(51) Int. Cl.
*B60W 30/12* (2020.01)
*G01C 21/34* (2006.01)
(Continued)

(52) U.S. Cl.
CPC .............. *B60W 30/12* (2013.01); *G01C 21/34* (2013.01); *G08G 1/16* (2013.01); *B60W 30/09* (2013.01);
(Continued)

(58) Field of Classification Search
CPC .......... B60W 30/12; G01C 21/34; G08G 1/16
(Continued)

(56) References Cited

U.S. PATENT DOCUMENTS 9,764,735 B2 * 9/2017 Silvlin ............... B62D 15/0265
2013/0184976 A1 * 7/2013 Akiyama ............. B62D 15/025
701/116
(Continued)

FOREIGN PATENT DOCUMENTS

EP     2 942 251 A1    11/2015
JP    2006-154967 A     6/2006
(Continued)

OTHER PUBLICATIONS

PCT/ISA/210 from International Application PCT/JP2017/019591 with the English translation thereof.

*Primary Examiner* — Peter D Nolan
*Assistant Examiner* — Luke Huynh
(74) *Attorney, Agent, or Firm* — Carrier Blackman & Associates, P.C.; Joseph P. Carrier; Jeffrey T. Gedeon

(57) ABSTRACT

This vehicle control device is provided with: a detection unit; and an external environment recognition unit that extracts a target object and left and right recognition lines of a traveling path. Additionally, a local environment map creation unit of the vehicle control device calculates an area of activity of an own vehicle and left and right border lines which indicate a limit of non-interference with the target object. Furthermore, the local environment map creation unit calculates left and right recommended border lines during traveling of the own vehicle by adding a margin interval that narrows the left and right border lines toward the inside.

7 Claims, 20 Drawing Sheets

(51) Int. Cl.
*G08G 1/16* (2006.01)
*B60W 30/09* (2012.01)

(52) U.S. Cl.
CPC ..... *B60W 2520/10* (2013.01); *B60W 2552/00* (2020.02); *B60W 2554/40* (2020.02)

(58) Field of Classification Search
USPC .......................................................... 701/23
See application file for complete search history.

(56) References Cited

U.S. PATENT DOCUMENTS

| | | | |
|---|---|---|---|
| 2014/0200801 A1* | 7/2014 | Tsuruta ................. | B60W 30/10 |
| | | | 701/400 |
| 2017/0043769 A1 | 2/2017 | Madas et al. | |
| 2019/0016338 A1* | 1/2019 | Ishioka ........... | B60W 30/18163 |
| 2019/0143967 A1* | 5/2019 | Kutila ................. | G05D 1/0257 |
| | | | 701/23 |

FOREIGN PATENT DOCUMENTS

| | | |
|---|---|---|
| JP | 2009-252032 A | 10/2009 |
| JP | 2011-134071 A | 7/2011 |
| JP | 2012-079118 A | 4/2012 |
| JP | 4949063 B2 | 6/2012 |

* cited by examiner

FIG. 6
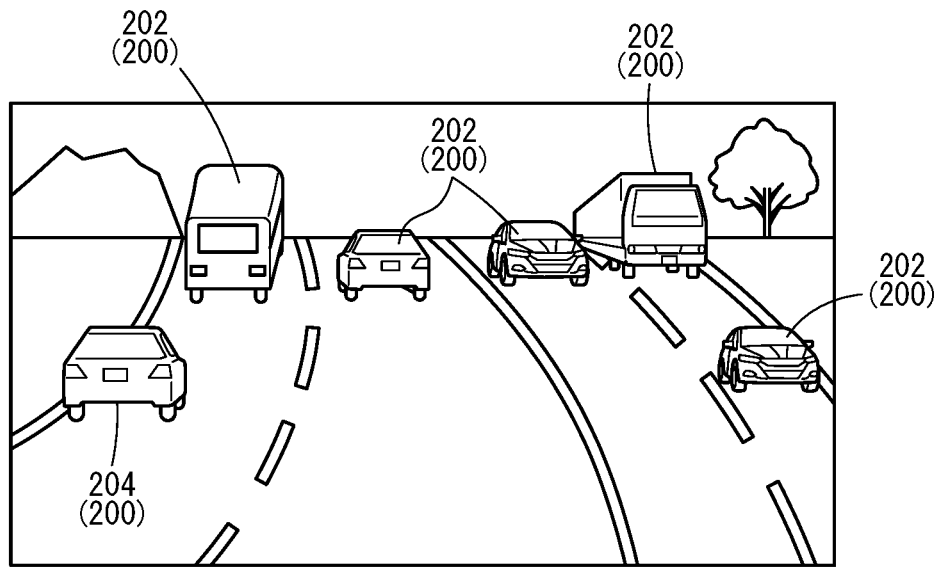
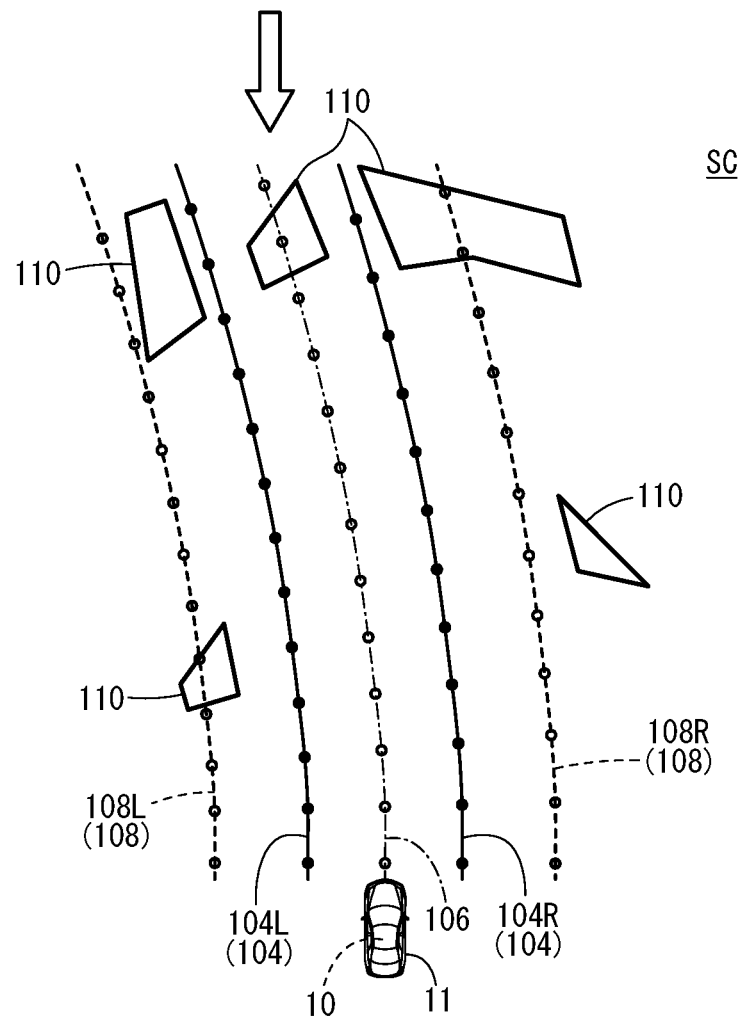

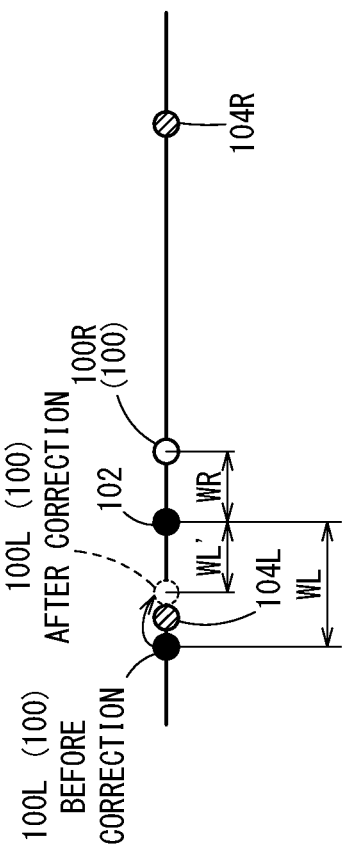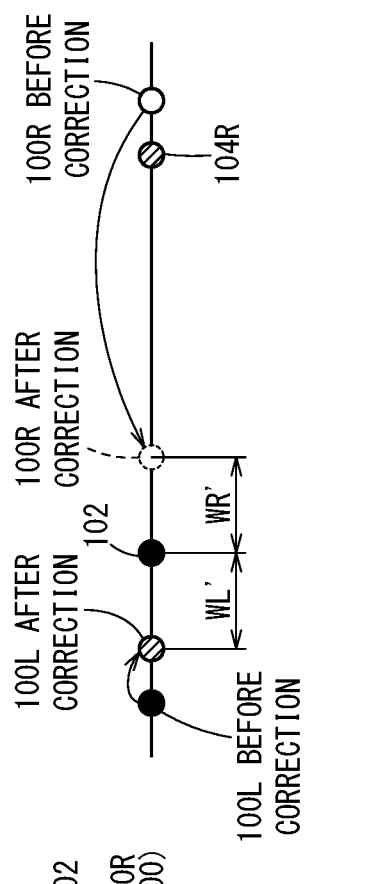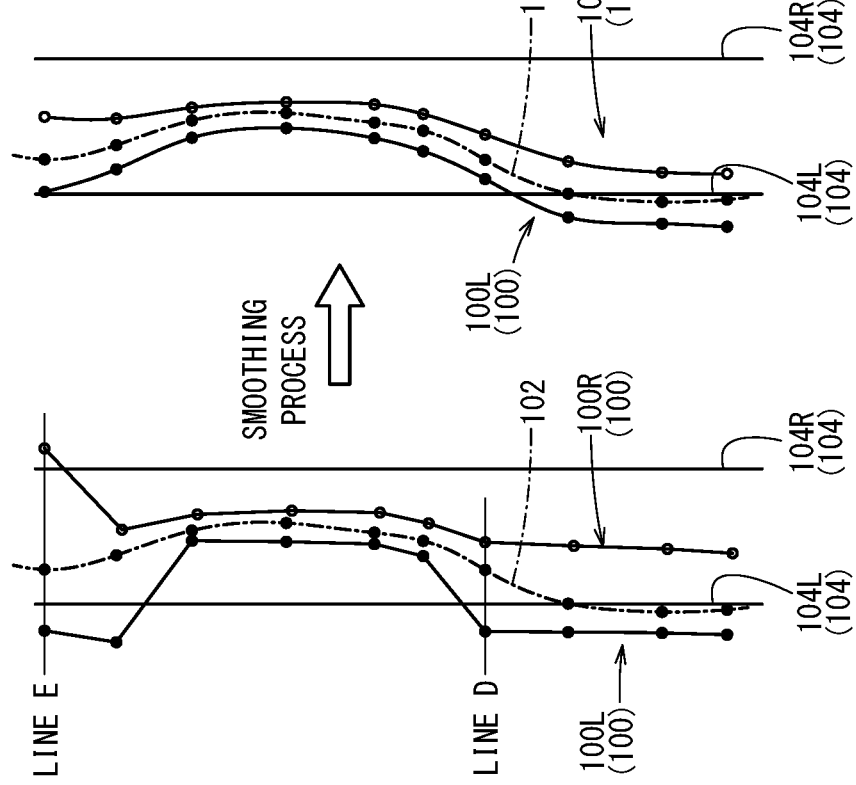

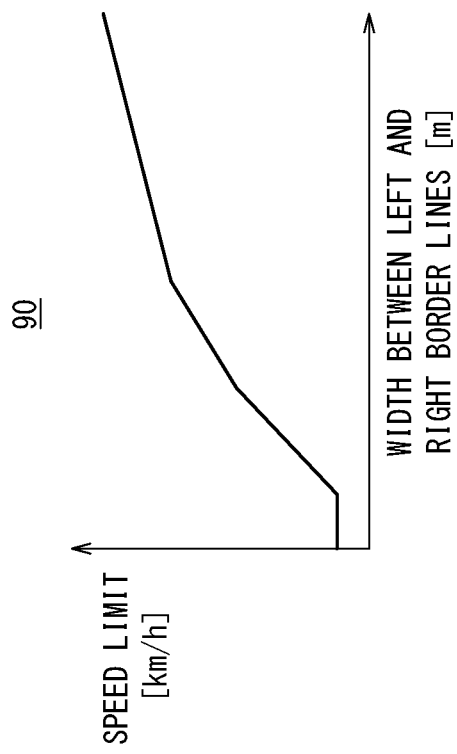
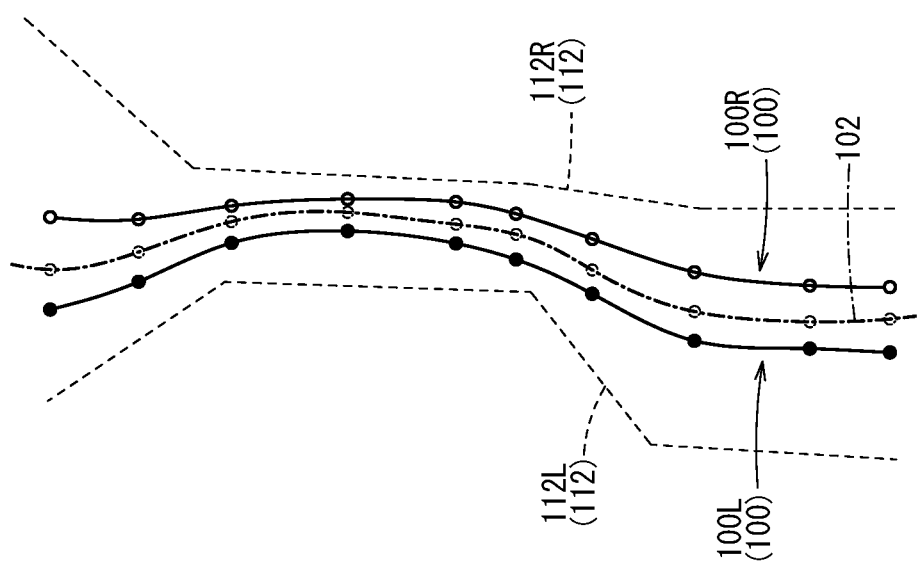

VEHICLE CONTROL DEVICE

TECHNICAL FIELD

The present invention relates to a vehicle control device that controls automated driving or driving assistance of a vehicle.

BACKGROUND ART

A vehicle control device that controls automated driving or driving assistance of a vehicle (host vehicle), at the time of control, detects a peripheral environment of the host vehicle and calculates a travel route and speed in accordance with this peripheral environment. For example, in a driving assistance device disclosed in Japanese Patent No. 4949063, if a target (obstacle such as another vehicle) is detected on a travel path of a host vehicle, the driving assistance device generates an avoidance route (travel route) to avoid the target on the basis of the turning control amount of the host vehicle.

Incidentally, in the peripheral environment during traveling, various elements of the travel path (for example, there are a plurality of travel lanes), various elements of the target (for example, there are a plurality of targets and the position of the target changes as time elapses), and the like are related with each other complicatedly. In particular, it is preferable that the host vehicle travels at a certain distance from the target that may interfere with the host vehicle. However, as in the driving assistance device disclosed in Japanese Patent No. 4949063, if the avoidance route for one target is generated on the basis of the turning control amount of the host vehicle, an action for another target becomes unsettled. Thus, for example, an interference possibility becomes high and the host vehicle cannot travel efficiently, which are disadvantageous.

SUMMARY OF INVENTION

The present invention has been made in view of the above circumstances, and an object thereof is to provide a vehicle control device that can reduce an interference possibility and cause a host vehicle to travel efficiently by generating a travel path where the host vehicle can travel while keeping a certain distance from a target in consideration of various elements of a peripheral environment of the host vehicle.

To achieve the above object, the present invention provides a vehicle control device that performs travel control of a host vehicle at least partially automatically, the vehicle control device including: a detection unit configured to detect a peripheral environment of a travel path where the host vehicle travels; an external environment recognition unit configured to, on a basis of detection information from the detection unit, extract left and right recognition lines on the travel path and extract a target that exists on the travel path; and an information generation unit configured to calculate left and right border lines that express a range of action of the host vehicle and a limit of non-interference with the target in the travel path on a basis of information about the left and right recognition lines and the target, and calculate left and right recommended border lines during traveling of the host vehicle by adding an interval margin to each of the left and right border lines, the interval margin being added so as to narrow a width between the left and right border lines.

In the above configuration, since the information generation unit calculates the left and right recommended border lines by adding the interval margin to the left and right border lines, the vehicle control device can acquire the information that allows the host vehicle to travel with a margin for various targets on the travel path in the automated driving or the driving assistance of the host vehicle. Thus, the vehicle control device can set a travel route compatible with the plurality of targets on the basis of the left and right recommended border lines. By this travel route, vehicle occupant's anxiety can be reduced and the efficient travel control can be achieved in consideration of the plurality of targets.

If an interval between the left and right recommended border lines in a width direction is less than or equal to a predetermined threshold, the information generation unit may perform correction to move the left and right recommended border lines toward outside in the width direction.

The vehicle control device performs the correction so that the left and right recommended border lines are moved toward the outside in the width direction. Thus, it is possible to suppress the occurrence of a trouble in the travel control of the host vehicle due to the narrow interval between the generated left and right recommended border lines, for example.

In addition to the above configuration, if a left recommended border line is positioned on a right side of a right recommended border line, it is preferable that the information generation unit moves the left recommended border line to a left side of the right recommended border line in the correction.

In the case where the left recommended border line is positioned on the right side of the right recommended border line, the positions of the left recommended border line and the right recommended border line are reversed. Thus, by performing a process of eliminating this reverse, the vehicle control device can suppress the occurrence of the trouble in the travel control of the host vehicle due to the reverse.

The information generation unit may be configured to generate left and right limit lines that are obtained by adding a deviation-allowing interval to each of the left and right recognition lines, and if one of the left and right recommended border lines overlaps with one of the left and right limit lines, only another of the left and right recommended border lines may be moved toward the outside in the width direction in the correction.

If one of the left and right recommended border lines overlaps with one of the left and right limit lines, the vehicle control device moves only the other of the left and right recommended border lines toward the outside in the width direction. Thus, it is possible that the left and right recommended border lines do not go beyond the left and right border lines. Therefore, it is possible to suppress the generation of the route where the host vehicle largely deviates from the travel path.

It is preferable that the information generation unit moves the left and right recommended border lines toward the outside in the correction in a range in which the left and right recommended border lines do not go beyond the left and right border lines.

Thus, the left and right recommended border lines exist inside the left and right border lines. Therefore, it is possible to prevent the generation of the route where the host vehicle interferes with the target.

It is preferable that the information generation unit sets restriction points where the host vehicle passes inside the left and right recommended border lines, and calculates a recommended travel route in which curvature, a travel distance, and a difference from a center of the left and right recommended border lines are minimized in a state where the restriction points are arranged.

For example, the recommended travel route in which the curvature, the travel distance, and the difference from the center of the left and right recommended border lines are minimized expresses a route in which the decrease of the vehicle speed of the host vehicle or the useless movement in the steering can be suppressed. Thus, by adjusting the speed and the steering angle during traveling so as to match this recommended travel route as much as possible, the vehicle control device enables the host vehicle to travel smoothly.

The information generation unit may adjust the left and right recommended border lines so that the recommended travel route is positioned on a center in a width direction.

By adjusting the left and right recommended border lines on the basis of the recommended travel route, the vehicle control device can acquire the left and right recommended border lines that smoothly continue. By these left and right recommended border lines, the route pattern that does not cause unnatural behavior of the host vehicle can be generated more efficiently.

It is preferable that the information generation unit calculates a width between the left and right border lines in a width direction and acquires, on a basis of reference information stored in a storage unit in advance, target speed that is in accordance with the width.

By acquiring the target speed in accordance with the width between the left and right border lines, if the width between the left and right border lines is narrow, for example, the vehicle control device can set the target speed for decreasing the travel speed of the host vehicle. Thus, the vehicle occupant's anxiety can be reduced.

It is preferable that, before calculating the left and right border lines, the information generation unit classifies an action for the target that has been extracted, into any one of left avoidance, right avoidance, stop, disregard, and following, and generates the left and right border lines on a basis of the classification of the left avoidance or the right avoidance.

By determining the classification of the action for the target in advance, in the generation of the left and right border lines, the vehicle control device reduces the possibility of generating the complicated border lines. Thus, the border lines can be acquired efficiently and favorably.

It is preferable that the information generation unit is configured to generate a polygon target on the basis of the information about the target from the external environment recognition unit, and if the target is a moving object, the information generation unit generates, as the polygon target, a predicted polygon target in which a position of the moving object changes as time elapses.

By generating the predicted polygon target for the moving object, the vehicle control device can calculate the left and right recommended border lines in accordance with the predicted polygon target. Thus, it is possible to favorably generate the route where the host vehicle can reliably avoid the moving object.

BRIEF DESCRIPTION OF DRAWINGS

FIG. 6 is an explanatory diagram for describing a process in which a target recognition action unit generates a polygon target;

FIG. 17A to FIG. 17C are explanatory diagrams for describing smoothing of the left and right recommended border lines;

FIG. 20A is an explanatory diagram that illustrates a width between the left and right border lines, and FIG. 20B is a reference graph that shows relation between the width between the left and right border lines and speed limit.

DESCRIPTION OF EMBODIMENT

A preferred embodiment of a vehicle control device according to the present invention is hereinafter described in detail with reference to the attached drawings.

Figure 1:
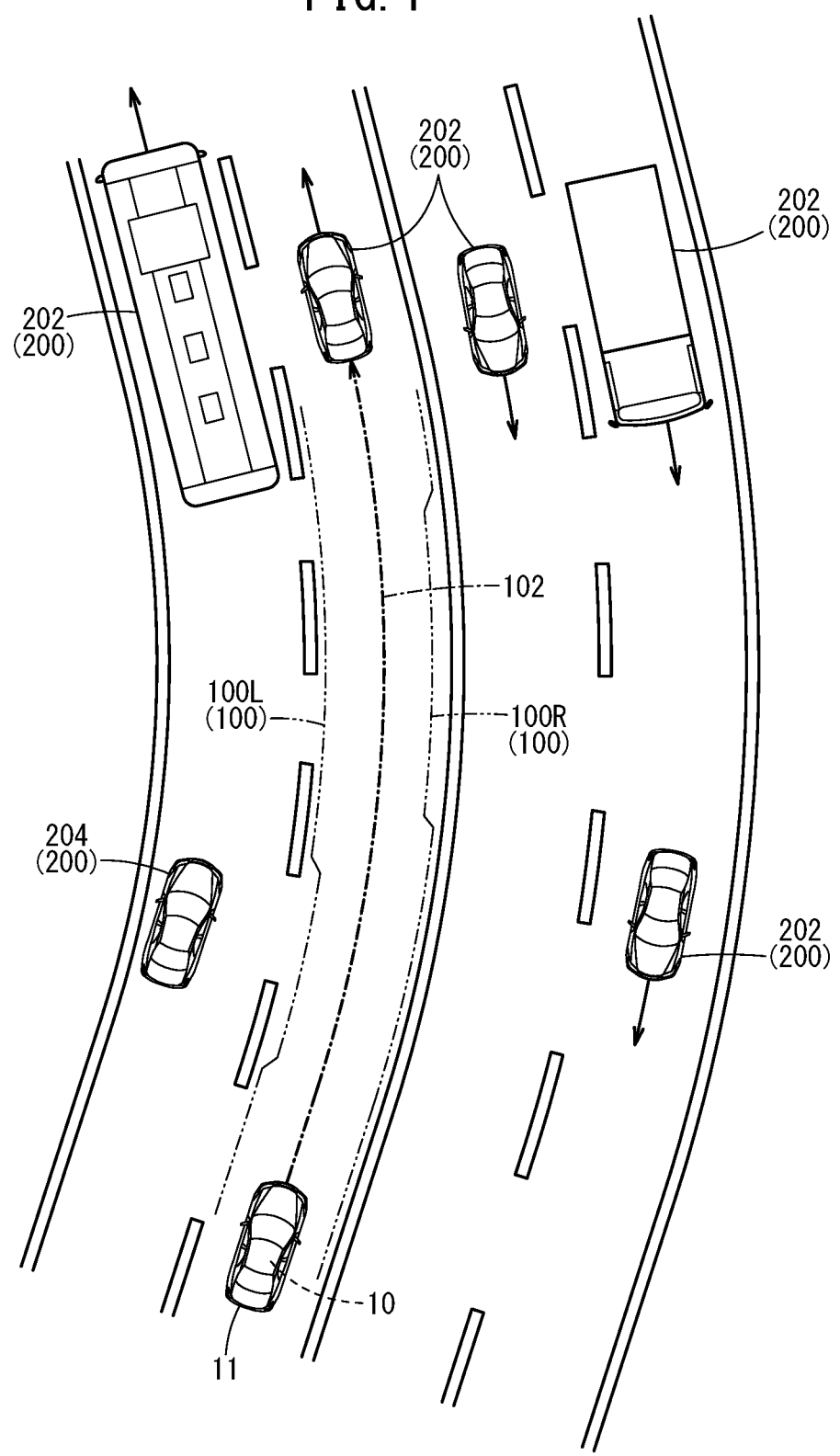
FIG. 1 is a plan view that illustrates left and right recommended border lines and a recommended travel route generated by a vehicle control device according to one embodiment of the present invention.

A vehicle control device 10 according to one embodiment of the present invention is a control unit that is mounted in a vehicle 11 (hereinafter also referred to as host vehicle 11) as illustrated in FIG. 1, and that controls automated driving of the host vehicle 11. In the automated driving, speed control of adjusting the vehicle speed of the host vehicle 11 (for example, accelerating, decelerating, or keeping speed), and steering control of adjusting a traveling direction of the host vehicle 11 are integrally performed.

Moreover, the vehicle control device 10 according to the present embodiment recognizes a peripheral environment of the host vehicle 11, and generates left and right recommended border lines 100 and a recommended travel route 102 suitable for a travel situation of the host vehicle 11 (for example, signs such as a lane marking that defines travel path, and targets such as a stationary object and a moving object). The left and right recommended border lines 100 and the recommended travel route 102 correspond to information about the travel path in consideration of various elements of the peripheral environment, and correspond to index information to allow the host vehicle 11 to travel with a sufficient margin for the target.

For example, when the vehicle control device 10 performs the automated driving, the left and right recommended border lines 100 and the recommended travel route 102 can be used for generating a trajectory including a route and speed. Thus, the vehicle control device 10 can cause the host vehicle 11 to travel safely and efficiently in accordance with the various elements of the peripheral environment. This vehicle control device 10 is hereinafter described specifically.

[Overall Configuration of Host Vehicle 11]

Figure 2:
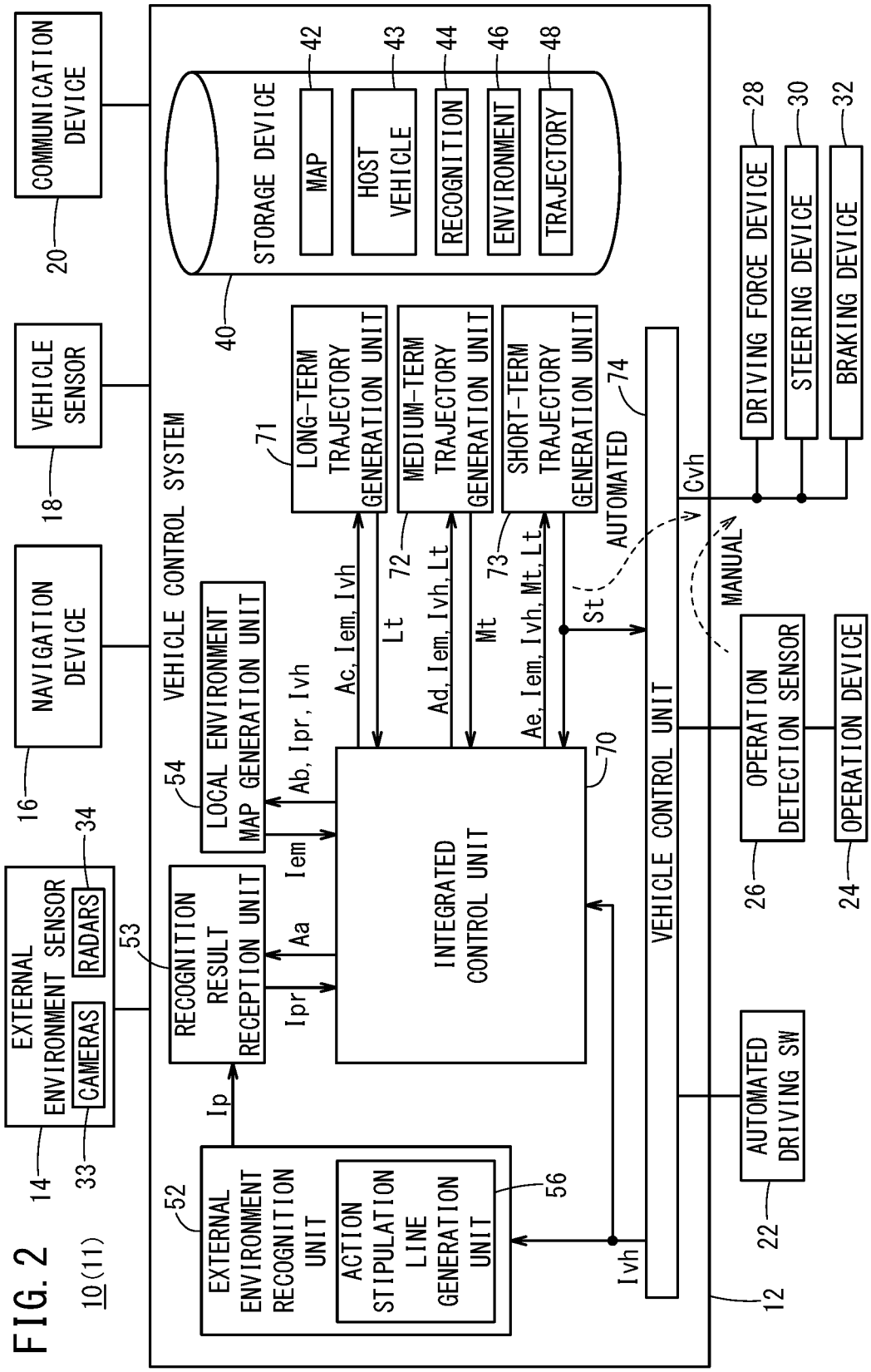
FIG. 2 is a schematic configuration block diagram of the vehicle control device in FIG. 1.

As illustrated in FIG. 2, the vehicle control device 10 includes a vehicle control system 12 (electronic control unit) which is a main part of a system, and moreover includes an input device and an output device that are connected to the vehicle control system 12 through a communication line. The input device includes an external environment sensor 14, a navigation device 16, a vehicle sensor 18, a communication device 20, an automated driving switch 22 (automated driving SW), an operation detection sensor 26, and the like. The output device includes a driving force device 28, a steering device 30, a braking device 32, and the like.

The external environment sensor 14 is a detection unit that recognizes a peripheral environment (external environment) of the host vehicle 11, and in the present embodiment, includes one or more cameras 33 and one or more radars 34. The cameras 33 and the radars 34 detect an external environment in accordance with their characteristics, and output this detection information to the vehicle control system 12. The external environment sensor 14 may be formed of one kind of device or may include another device. Examples of the other device include an infrared ray sensor, an ultrasonic sensor, and a LIDAR (optical detection device).

The navigation device 16 detects and specifies the current position of the host vehicle 11 using a satellite positioning device or the like, and calculates a route from the current position to a destination specified by the user. The information from the navigation device 16 (map information, the current position, the calculated route, or the like) is provided to the vehicle control system 12 as necessary, and stored in a map information storage unit 42 of a storage device 40.

The vehicle sensor 18 is a sensor device group (vehicle state detection unit) that detects the state of the host vehicle 11 and outputs a result of the detection to the vehicle control system 12 during traveling of the host vehicle 11, for example. This sensor device group includes a vehicle speed sensor that detects the vehicle speed of the host vehicle 11, an acceleration sensor that detects the acceleration, a yaw rate sensor that detects the angular velocity around a vertical axis of the host vehicle 11, an azimuth sensor that detects the orientation of the host vehicle 11, an inclination sensor that detects the inclination of the host vehicle 11, and the like. The detection information detected by the vehicle sensor 18 (or a vehicle control unit 74) is stored as host vehicle state information Ivh in a host vehicle state information storage unit 43 of the storage device 40.

The communication device 20 is provided to communicate with an external communication device (a road-side device, another vehicle, a server of traffic system, or the like) existing outside the host vehicle 11. For example, the communication device 20 receives information regarding a traffic light (the position, the color) from the road-side device, receives probe information regarding the other vehicle from the other vehicle, receives updated map information or another information from the server, and transmits the probe information about the host vehicle 11 and the like to the outside.

The automated driving switch 22 is a switch for a vehicle occupant to change between a manual driving mode and an automated driving mode. In the manual driving mode, the vehicle occupant operates an operation device 24 of the host vehicle 11 so as to operate the output device (the driving force device 28, the steering device 30, the braking device 32) to cause the host vehicle 11 to travel, for example.

Examples of the operation device 24 include an accelerator pedal, a steering wheel (handle), a brake pedal, a shift lever, and a direction indicating lever. Each configuration of the operation device 24 is provided with the operation detection sensor 26 that detects the presence or absence of an operation made by the vehicle occupant, the operation amount, or the operation position. The operation detection sensor 26 outputs, to the vehicle control system 12, the accelerator depression amount (accelerator opening degree), the steering wheel operation (steering) amount, the brake pedal depression amount, a shift position, a right/left turning direction, or the like as a detection result.

In the automated driving mode, the host vehicle 11 travels, for example, under control of the vehicle control device 10 in a state where the vehicle occupant does not operate the operation device 24. While the automated driving mode is performed, the vehicle control system 12 generates an action plan (long-term trajectory Lt, medium-term trajectory Mt, short-term trajectory St to be described below) on the basis of a peripheral environment of the host vehicle 11, and controls the output device (the driving force device 28, the steering device 30, the braking device 32) in accordance with this action plan as appropriate.

The driving force device 28 includes a driving force ECU, and a driving source such as an engine or a traction motor that are not shown. The driving force device 28 generates travel driving force (torque) in accordance with a vehicle control value Cvh that is input from the vehicle control system 12, and transmits the travel driving force to wheels through a transmission (or directly).

The steering device 30 includes an EPS (electric power steering) ECU and an EPS device that are not shown. The steering device 30 changes the orientation of the wheels (steering wheels) in accordance with the vehicle control value Cvh that is input from the vehicle control system 12.

The braking device 32 is, for example, an electric servo brake that is used in combination with a hydraulic brake, and includes a brake ECU and a brake actuator that are not shown. The braking device 32 brakes the wheels in accordance with the vehicle control value Cvh that is input from the vehicle control system 12.

[Configuration of Vehicle Control System 12]

The vehicle control system 12 is configured as an electronic control unit (ECU) including an input/output I/F and a processor, which are not shown, and includes the storage device 40 that is mounted on or connected to the ECU. The processor executes programs which are not shown and stored in the storage device 40, and forms function realization units such as an external environment recognition unit 52, a recognition result reception unit 53, a local environment map generation unit 54, an integrated control unit 70, a long-term trajectory generation unit 71, a medium-term trajectory generation unit 72, a short-term trajectory generation unit 73, and the vehicle control unit 74. Note that, in the present embodiment, the function realization unit is a software function unit as described above. However, the function realization unit may be realized alternatively by a hardware function unit including an integrated circuit or the like.

The external environment recognition unit 52 generates extraction information Ip about an object existing around the host vehicle 11 on the basis of each detection information input from the external environment sensor 14, the navigation device 16, the communication device 20, and the like. When the extraction information Ip is generated, a relative positional relation of the object with respect to the host vehicle 11 (the orientation or distance of the object with respect to the host vehicle 11) is also recognized with reference to the detection result from the radars 34 or the like, the host vehicle state information Ivh transmitted from the vehicle sensor 18 or the vehicle control unit 74, and the like. For example, the external environment recognition unit 52 extracts the object such as a lane marking (a white line, a yellow line, a marker, or the like), a border between a paved part and an unpaved part, a road shoulder, a guard rail, a curbstone, a wall, a stop line, a traffic light, a sign, a traffic participant, or an obstacle on the road where the host vehicle 11 travels, on the basis of image information from the cameras 33.

Figure 3:
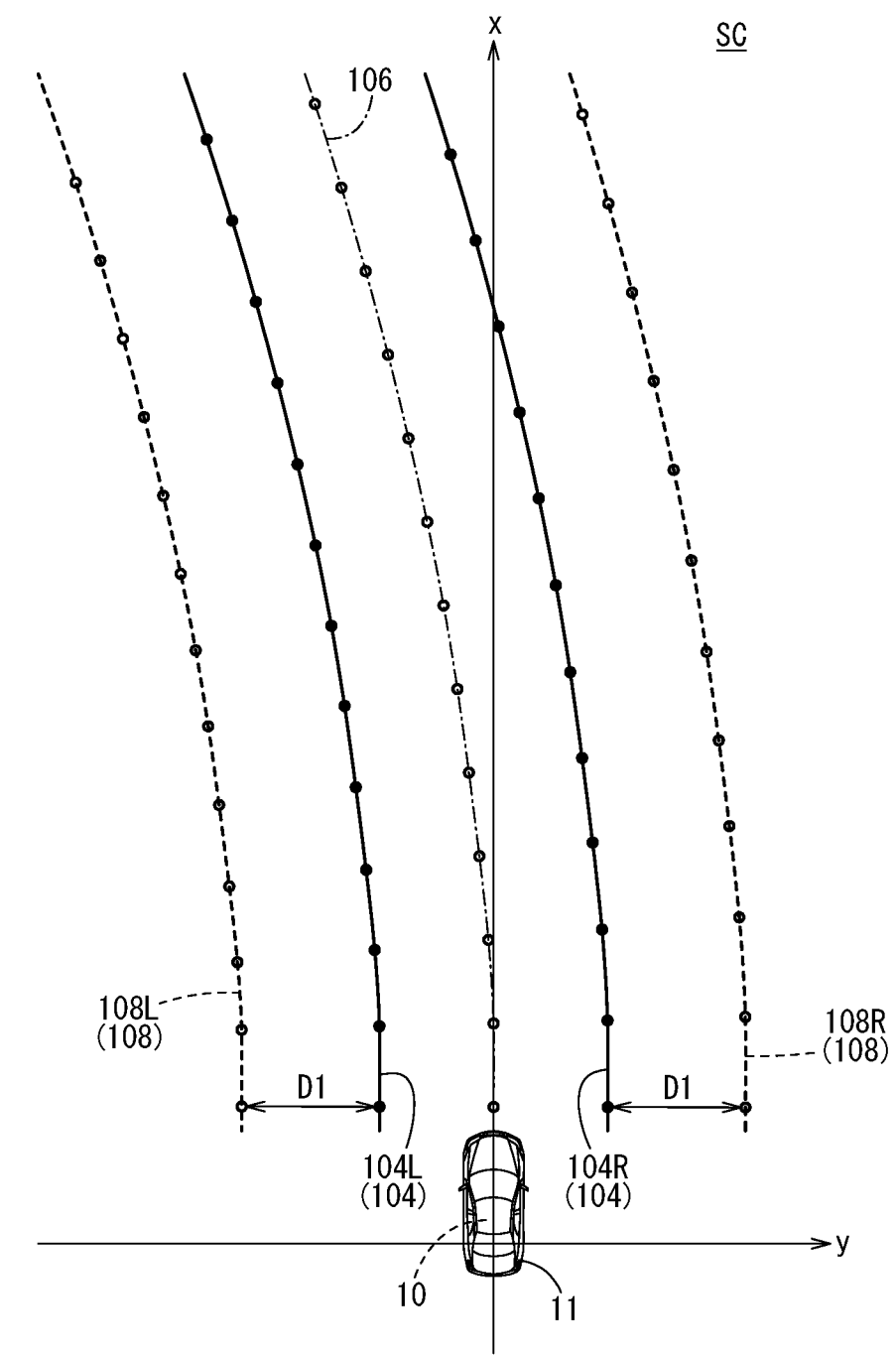
FIG. 3 is an explanatory diagram for describing a process in which an external environment recognition unit calculates left and right recognition lines.

Here, the lane marking, the border between the paved part and the unpaved part, and the like express the travel path and do not interrupt traveling of the host vehicle 11. The external environment recognition unit 52 extracts these objects on the basis of suitable image processing and then generates, by polynomial approximation, two recognition lines 104 (a left recognition line 104L, a right recognition line 104R) that continue on virtual plane coordinates SC and are parallel to each other, as illustrated in FIG. 3. Thus, even if the lane marking on the travel path is blurred or the lane marking cannot be recognized because of the target, the left and right recognition lines 104 compensate for the lane marking. Note that if the detection of the lane marking or the like by the cameras 33 is vague or lost, the external environment recognition unit 52 may compensate for the recognition line 104 with the map information stored in the map information storage unit 42.

The left and right recognition lines 104 are configured as a point sequence corresponding to points extracted from a polynomial (coordinate points on virtual plane coordinates SC) at predetermined intervals. Moreover, the external environment recognition unit 52 also calculates a center line 106 that extends halfway between the left and right recognition lines 104, and this center line 106 is included in the extraction information Ip. This center line 106 is also configured as a point sequence in which the coordinate points are arranged.

Among the objects (targets 200) that do not express the travel path, the traveling other vehicle or the like is regarded as a moving object 202 that affects the traveling of the host vehicle 11. Moreover, the guard rail, the curbstone, the wall, the stopping other vehicle, the obstacle, or the like is regarded as a stationary object 204 that affects the traveling of the host vehicle 11. The moving object 202 and the stationary object 204 are different from each other in that the position of the moving object 202 in the travel path changes as time elapses and the position of the stationary object 204 in the travel path does not change substantially as time elapses. Note that the traffic participant such as a person may be regarded as either the moving object 202 or the stationary object 204. This is because the route that avoids the target 200 is set in the end by a process to be described below.

For example, the external environment recognition unit 52 extracts the shape (edge) of the target 200 that is similar among a plurality of images, and recognizes the speed of the target 200 (that is, the moving object 202, the stationary object 204) on the basis of the speed of the host vehicle 11. Moreover, each target 200 is output as information whose position is specified on the virtual plane coordinates SC where the recognition line 104 exists.

Furthermore, as shown by dotted lines in FIG. 3, the external environment recognition unit 52 according to the present embodiment sets a range to be considered when the action plan of the host vehicle 11 is designed, as left and right action stipulation lines 108 (a left action stipulation line 108L, a right action stipulation line 108R), and the left and right action stipulation lines 108 are included in the extraction information Ip. Thus, as shown in FIG. 2, an action stipulation line generation unit 56 is provided in the external environment recognition unit 52. Note that the action stipulation line generation unit 56 may be provided in the local environment map generation unit 54.

If the external environment recognition unit 52 has extracted the left and right recognition lines 104 on the travel path, the action stipulation line generation unit 56 generates the left and right action stipulation lines 108 that are shifted (offset) by a predetermined setting interval D1 toward the outside in the width direction of each of the left and right recognition lines 104. For example, the left action stipulation line 108L with 5 m added to the left recognition line 104L on a left side in the width direction, and the right action stipulation line 108R with 5 m added to the right recognition line 104R on a right side in the width direction, are generated. Note that the setting interval D1 is not limited to 5 m and may be designed freely, and may also be a value that varies on the basis of the reliability of the external environment sensor 14 or the like. The left and right action stipulation lines 108 are also formed as a point sequence in which a plurality of coordinate points are arranged on the virtual plane coordinates SC.

The recognition result reception unit 53 regularly receives the above extraction information Ip (the left and right recognition lines 104, the center line 106, the left and right action stipulation lines 108, the moving object 202, and the stationary object 204) from the external environment recognition unit 52, and updates the old information. At a timing of receiving a calculation command Aa from the integrated control unit 70, the recognition result reception unit 53 transmits the extraction information Ip as external environment recognition information Ipr to the integrated control unit 70. This external environment recognition information Ipr is stored in an external environment recognition information storage unit 44 of the storage device 40.

The local environment map generation unit 54 is an information generation unit that generates local environment information Iem corresponding to the information about the travel path, on the basis of a calculation command Ab, the external environment recognition information Ipr, the host vehicle state information Ivh, and the like that are transmitted from the integrated control unit 70. The local environment information Iem is output to the integrated control unit 70 and stored in a local environment information storage unit 46 of the storage device 40. The specific configuration of this local environment map generation unit 54 is described in detail below.

The integrated control unit 70 functions as a task synchronizing module that synchronizes the tasks (processes) of the recognition result reception unit 53, the local environment map generation unit 54, the long-term trajectory generation unit 71, the medium-term trajectory generation unit 72, and the short-term trajectory generation unit 73, and transmits, to each function realization unit, information necessary for calculation. In detail, the integrated control unit 70 counts a reference calculation cycle inside thereof, outputs a calculation command to each function realization unit in accordance with a timing based on this reference calculation cycle to perform the process, and receives a result of the process.

On the other hand, the long-term trajectory generation unit 71, the medium-term trajectory generation unit 72, and the short-term trajectory generation unit 73 respectively generate the trajectory (long-term trajectory Lt, medium-term trajectory Mt, short-term trajectory St) including the vehicle speed necessary for the speed control and the route necessary for the steering control under the command from the integrated control unit 70. Each generated trajectory is output from each trajectory generation unit to the integrated control unit 70, and stored in a trajectory information storage unit 48 of the storage device 40.

The long-term trajectory generation unit 71 generates the long-term trajectory Lt corresponding to a trajectory for a relatively long period on the basis of a calculation command Ac, the local environment information Iem, and the host vehicle state information Ivh. For example, the long-term trajectory Lt is generated as a point sequence in which the coordinate points including time or speed information are arranged in a 10-second period at an interval of about several hundreds of milliseconds (about 9 times the reference calculation cycle).

The medium-term trajectory generation unit 72 generates the medium-term trajectory Mt corresponding to a trajectory for a period shorter than that of the long-term trajectory Lt on the basis of a calculation command Ad, the local environment information Iem, the host vehicle state information Ivh, and the long-term trajectory Lt. For example, the medium-term trajectory Mt is generated as a point sequence in which the coordinate points including time or speed information are arranged in a 5-second period at an interval of about one hundred and several tens of milliseconds (about 3 times the reference calculation cycle).

The short-term trajectory generation unit 73 generates the short-term trajectory St corresponding to a trajectory for a period shorter than that of the medium-term trajectory Mt on the basis of a calculation command Ae, the local environment information Iem, the host vehicle state information Ivh, the long-term trajectory Lt, and the medium-term trajectory Mt. For example, the short-term trajectory St is generated as a point sequence in which the coordinate points including vehicle dynamics information (a position x in a longitudinal direction, a position y in a lateral direction, an attitude angle $\theta z$, speed vs, acceleration va, curvature $\rho$, a yaw rate $\gamma$, and a steering angle $\delta st$) are arranged in a 1-second period at an interval of about several milliseconds (the reference calculation cycle).

On the other hand, the vehicle control unit 74 converts the coordinate point including the vehicle dynamics into the vehicle control value Cvh so that the host vehicle 11 travels along the input short-term trajectory St, and outputs the vehicle control value Cvh to the driving force device 28, the steering device 30, and the braking device 32. Moreover, information to drive the driving force device 28, the steering device 30, and the braking device 32 is transmitted as the host vehicle state information Ivh to the external environment recognition unit 52.

[Specific Configuration of Local Environment Map Generation Unit 54]

As described above, in the vehicle control device 10, the local environment map generation unit 54 generates the information about the peripheral environment of the host vehicle 11 (local environment information Iem), and each trajectory generation unit generates the trajectory on the basis of this local environment information Iem. Examples of the local environment information Iem include a polygon target 110, left and right border lines 112, the left and right recommended border lines 100, the recommended travel route 102, a vehicle stop position 114, and target speed 116.

Figure 7:
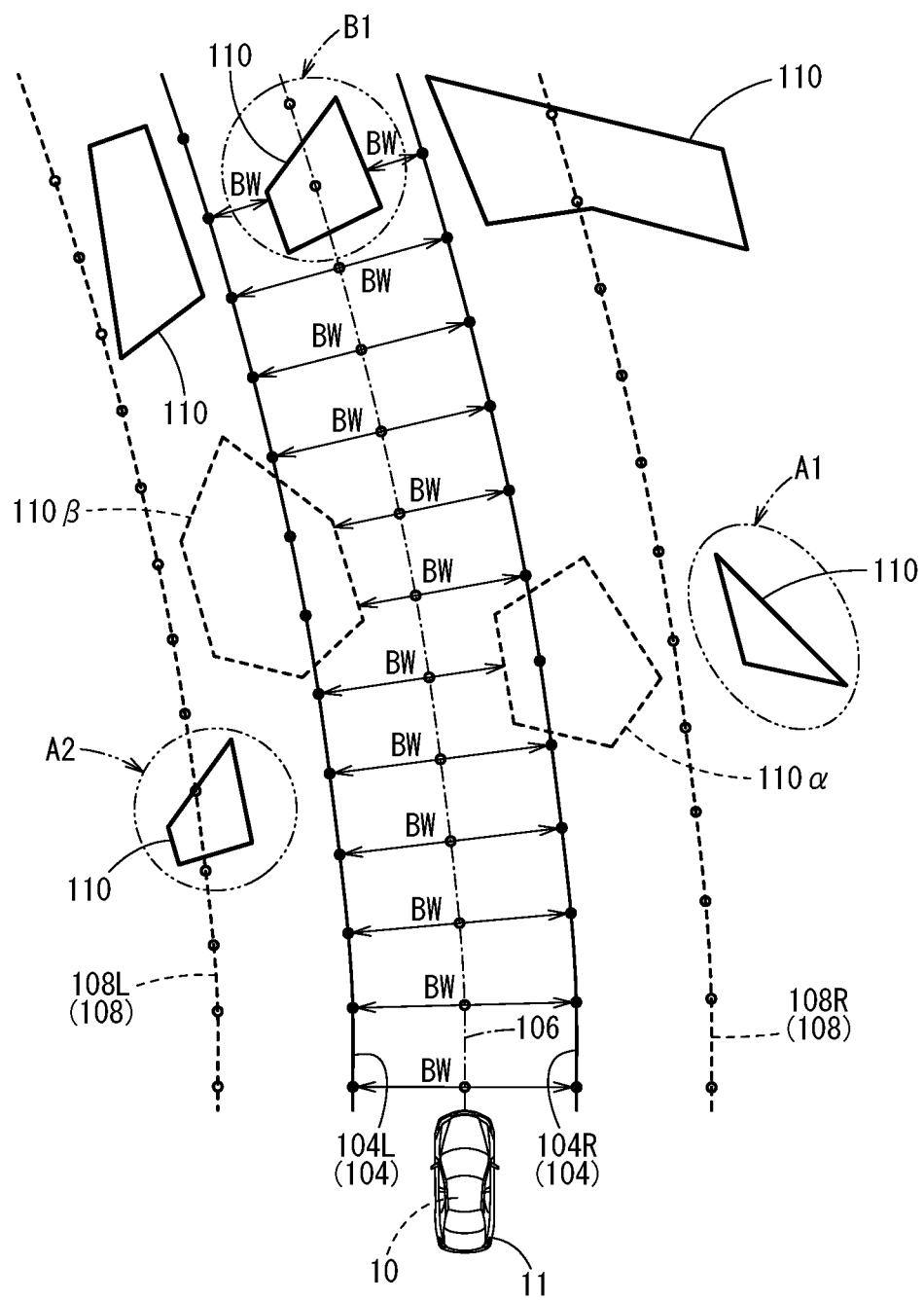
FIG. 7 is an explanatory diagram for describing classification of an action by a classification determination unit.

"Polygon target 110" is obtained by turning, into a polygon, the target 200 (the stationary object 204 and the moving object 202) existing in the peripheral environment of the host vehicle 11 (also see FIG. 6 and FIG. 7). The polygon target 110 is configured on the virtual plane coordinates SC as information about the target 200 that the host vehicle 11 needs to avoid on the basis of the extraction information Ip of the stationary object 204 and the moving object 202. The position and the shape of this polygon target 110 on the virtual plane coordinates SC are traced as time elapses.

Figure 10C:
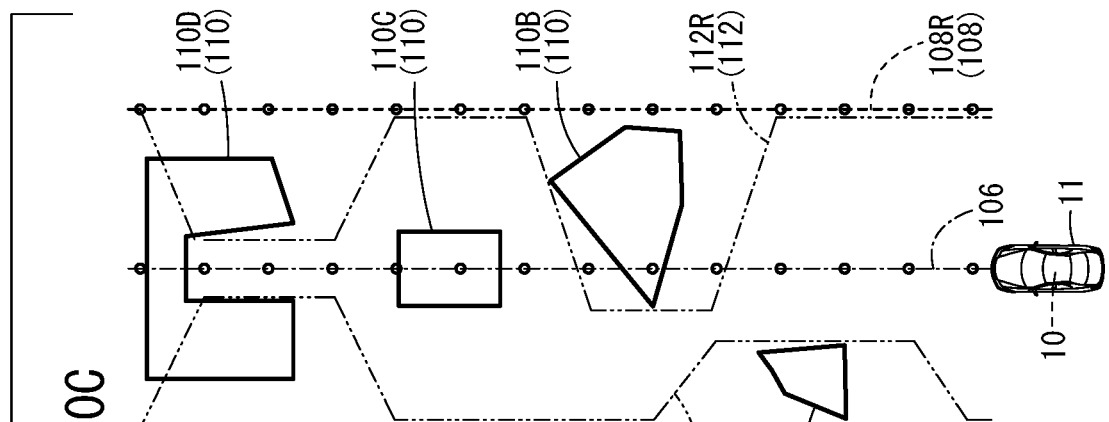
FIG. 10C is an explanatory diagram for describing a third process in which the left and right border lines are generated.

"Left and right border lines 112" correspond to borders between non-interference and interference of the host vehicle 11 with respect to the stationary object 204 or the moving object 202 (also see FIG. 10C). That is to say, the left and right border lines 112 are generated in consideration of the polygon target 110 that exists on the virtual plane coordinates SC. In other words, when the host vehicle 11 determines the action plan, the left and right border lines 112 serve as information about a range over which the host vehicle 11 is not moved.

Figure 13:
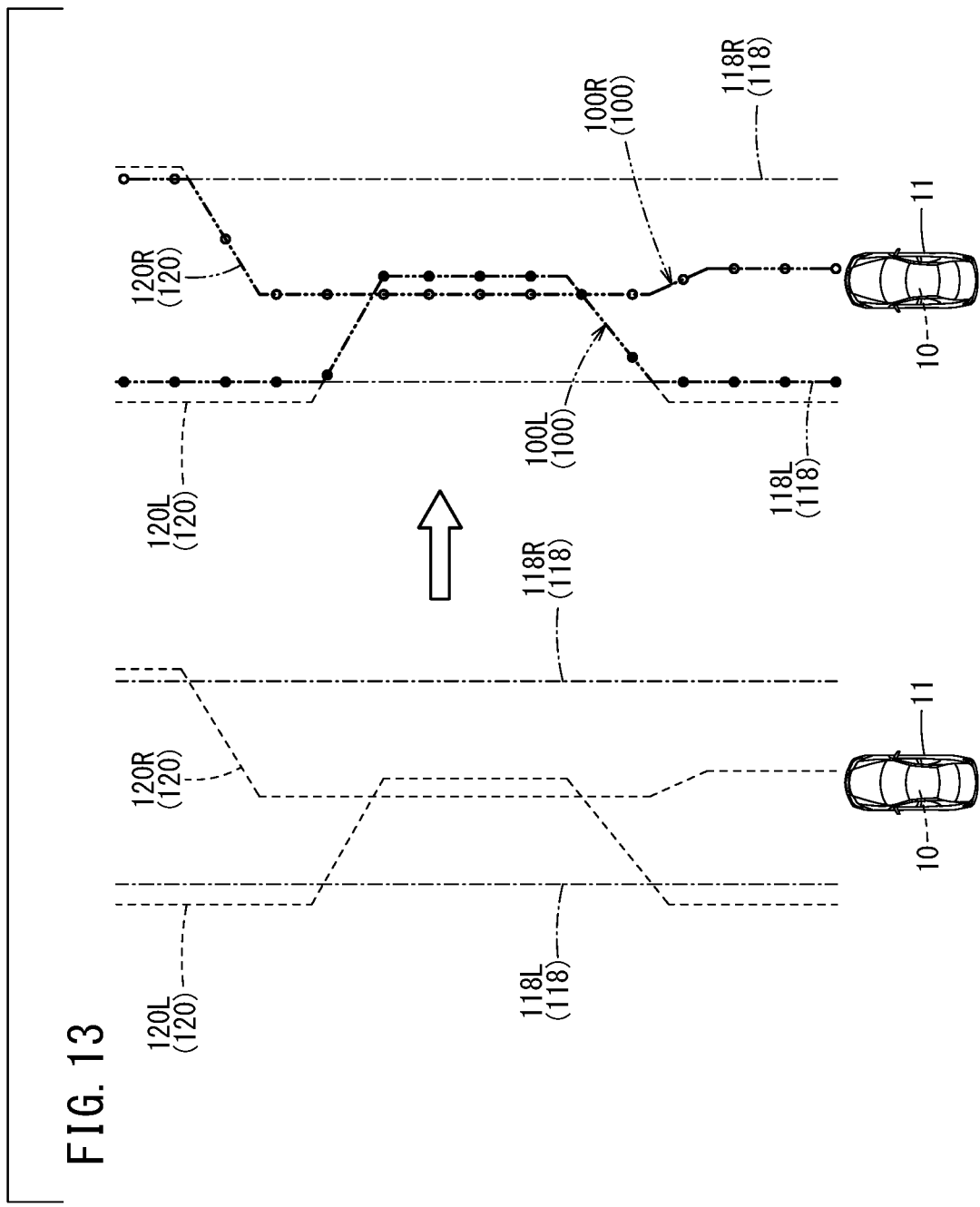
FIG. 13 is an explanatory diagram for describing a process in which the left and right recommended border lines are generated.

"Left and right recommended border lines 100" are obtained by calculating positions where the host vehicle 11 would travel with a certain distance from the target 200 on the basis of the left and right border lines 112, and correspond to (recommend) borders where the host vehicle 11 can travel safely and comfortably (also see FIG. 13). The left and right recommended border lines 100 are formed by adding an interval margin Dm (margin) to the left and right border lines 112, and are formed as recommended information in accordance with the actual travel path by being appropriately corrected.

Figure 16:
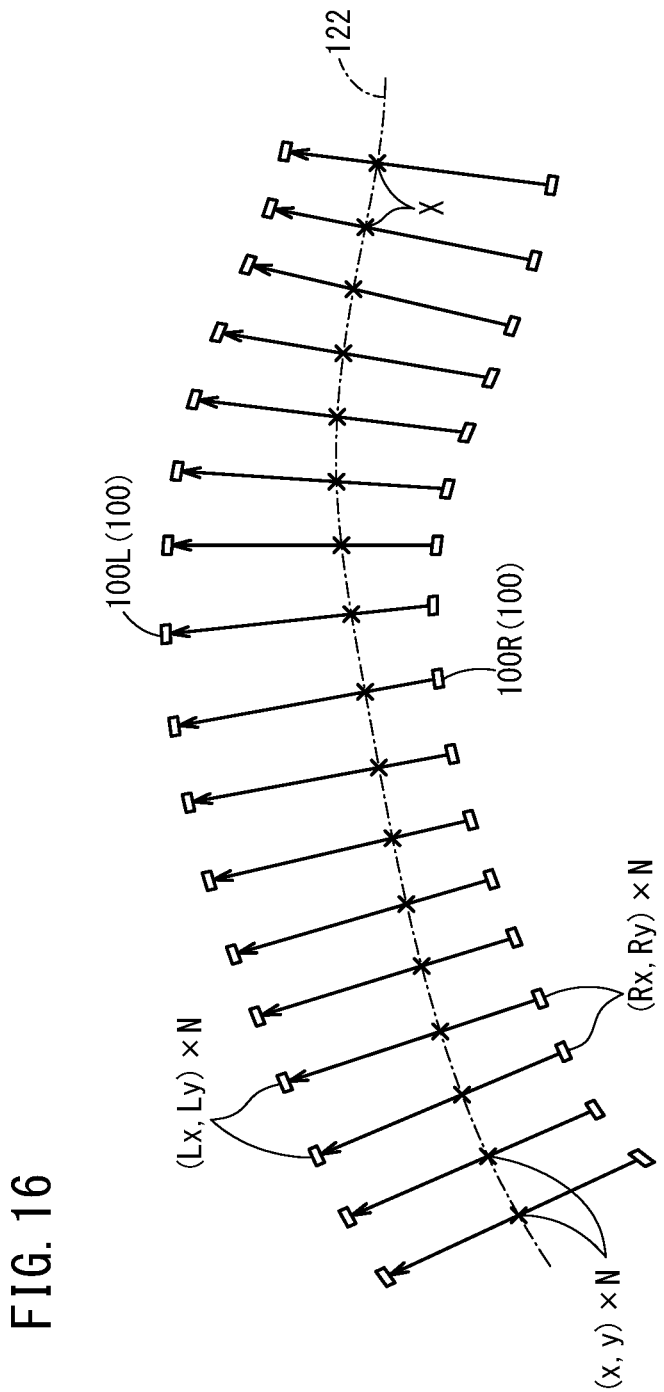
FIG. 16 is a plan view for describing a process in which the recommended travel route is calculated on the basis of the left and right recommended border lines.

"Recommended travel route 102" corresponds to a route that is formed so that the host vehicle 11 travels inside the left and right recommended border lines 100 (also see FIG. 16). In the present embodiment, the curvature, a travel distance, and the difference from the center of the left and right recommended borders in the traveling of the host vehicle 11 are weighted as appropriate, and the recommended travel route 102 is calculated so that these parameters become as small as possible. Thus, the recommended travel route 102 corresponds to a route in which the host vehicle 11 can travel more efficiently and comfortably.

Figure 18:
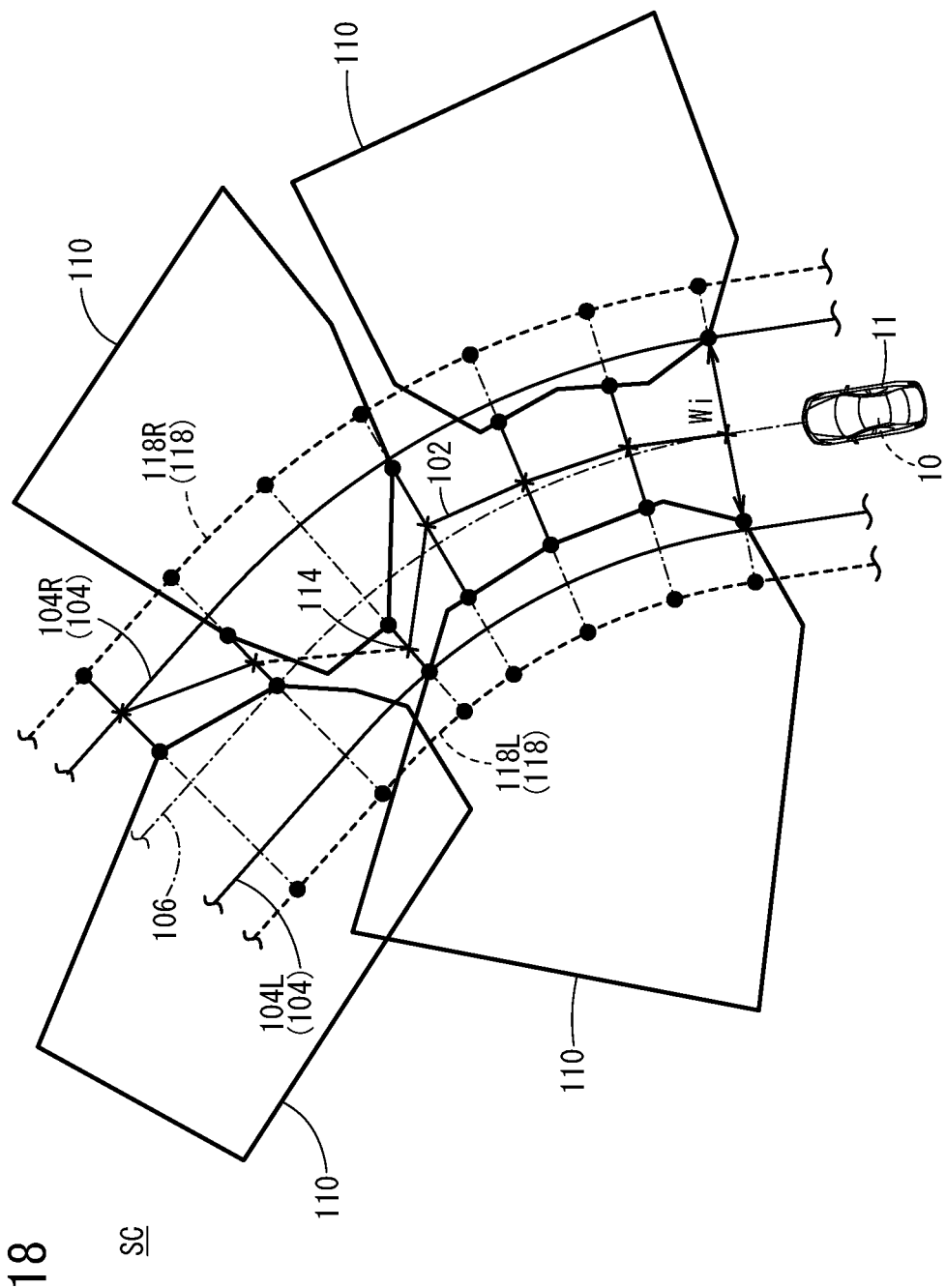
FIG. 18 is an explanatory diagram for describing generation of a vehicle stop position by a stop position generation unit.

"Vehicle stop position 114" corresponds to positional information about a position where the host vehicle 11 is stopped on the virtual plane coordinates SC if the host vehicle 11 cannot avoid the polygon target 110 (also see FIG. 18).

"Target speed 116" is a target value of the speed at which the host vehicle 11 travels on the virtual plane coordinates SC on the basis of the left and right recognition lines 104, the polygon target 110, the left and right border lines 112, the vehicle stop position 114, and the like (also see FIG. 20).

Figure 4:
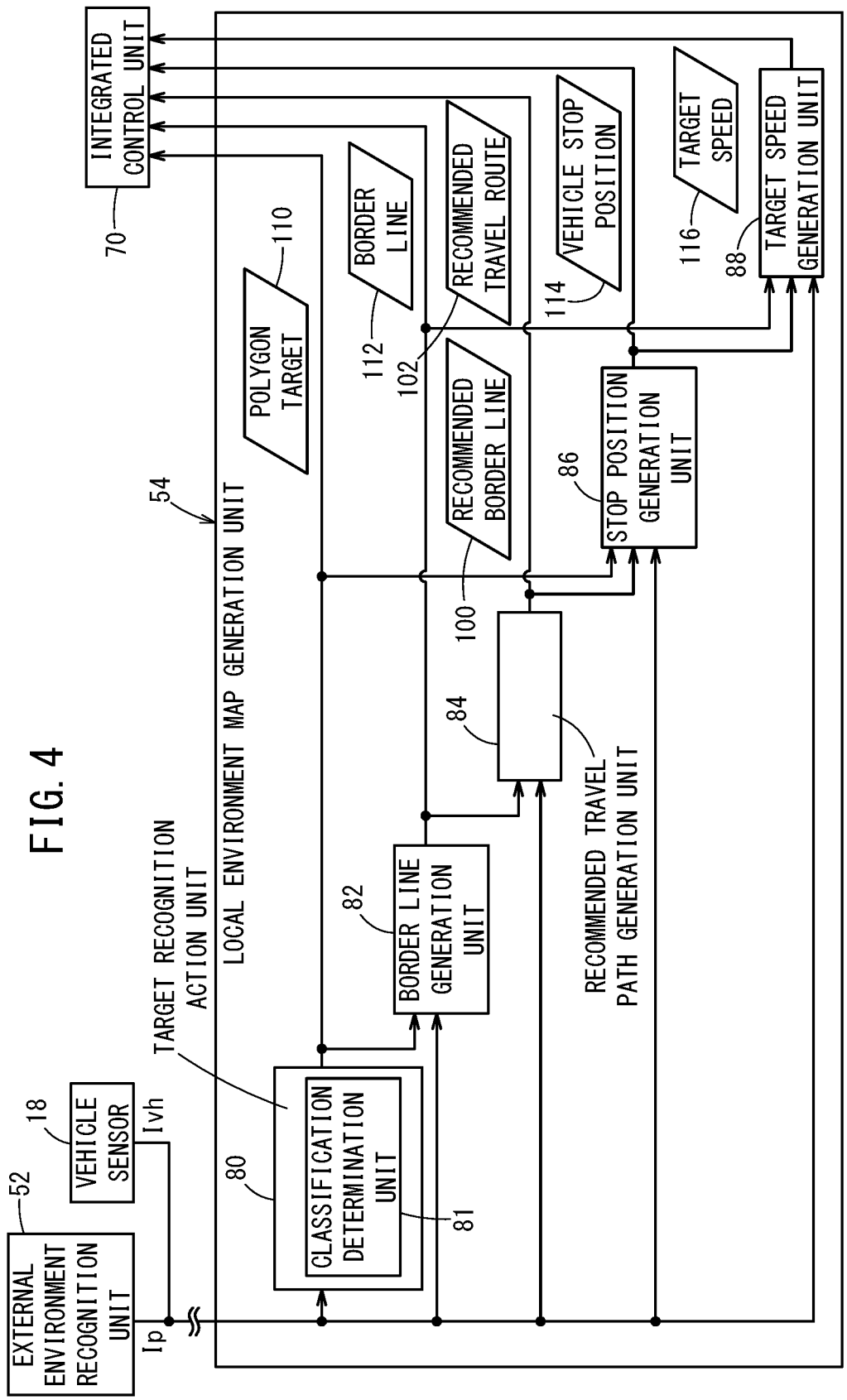
FIG. 4 is a block diagram that shows a configuration of a local environment map generation unit in FIG. 2.

To generate the information described above, the local environment map generation unit 54 includes a target recognition action unit 80, a border line generation unit 82, a recommended travel path generation unit 84, a stop position generation unit 86, and a target speed generation unit 88 as illustrated in FIG. 4. Then, each function realization unit of the local environment map generation unit 54 generates each piece of information in accordance with the procedure in FIG. 5.

Specifically, first, the polygon target 110 is generated based on the information about the target 200 (step S10). Next, the left and right border lines 112 are generated based on the polygon target 110 (step S20). Then, the left and right recommended border lines 100 are generated based on the left and right border lines 112 (step S30). In addition, when the left and right recommended border lines 100 are generated, the recommended travel route 102 is also generated and the left and right recommended border lines 100 are corrected based on the recommended travel route 102, for example. Moreover, in the generation procedure for the local environment information Iem, the vehicle stop position 114 is generated based on the polygon target 110 and the recommended travel route 102 (step S40), and lastly, the target speed 116 is generated based on the vehicle stop position 114, the left and right border lines 112, and the like (step S50). A configuration of each function realization unit is hereinafter described in detail.

Figure 5:
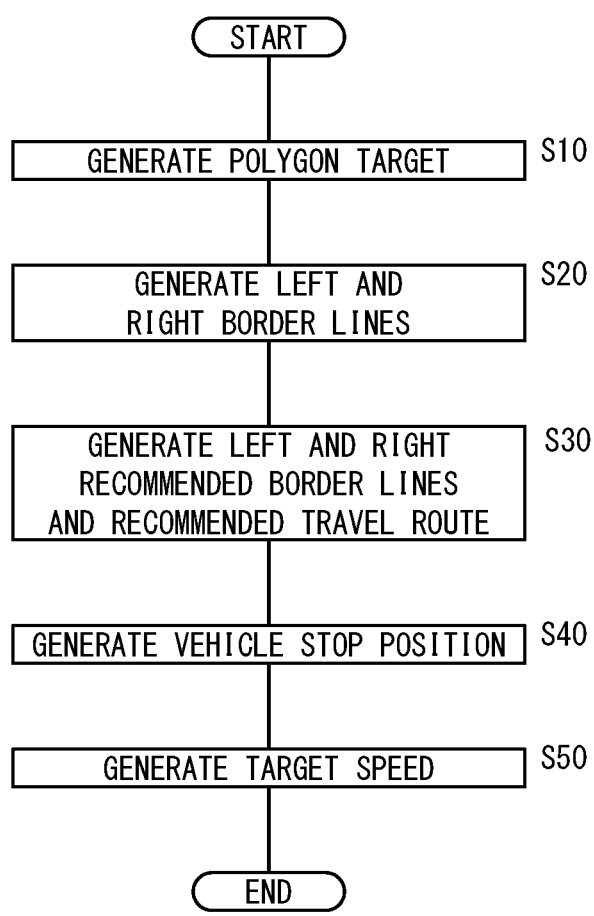
FIG. 5 is a flowchart that shows a procedure in the local environment map generation unit in FIG. 4.

The target recognition action unit 80 of the local environment map generation unit 54 is a function unit that performs step S10 in FIG. 5, and generates the polygon targets 110 for all the targets 200 extracted in the travel path. In particular, the target recognition action unit 80 according to the present embodiment forms the polygon target 110 also in consideration of the kinds of the stationary object 204, the moving object 202, and the like.

For example, as illustrated in FIG. 6, the target recognition action unit 80 forms a polygonal shape by connecting, as appropriate, edges, corner parts, protrusions, or the like of the extracted targets 200 (the guard rail, the curbstone, the wall, the traffic light, the sign, the traffic participant, the obstacle, or the like). Note that the polygon target 110 may be formed by only a part detected by the external environment sensor 14 (a part that can be seen by the cameras 33, for example). A non-detected part may be omitted by connecting ends of the detected part. In addition, if a plurality of the targets 200 overlap with each other when generating the polygon, it is preferable that the target recognition action unit 80 generates an integrated (strung) polygon. Thus, the polygon formed on the virtual plane coordinates SC is simplified, so that the process can be performed efficiently.

The target recognition action unit 80 includes a classification determination unit 81 that classifies an action of the host vehicle 11 on the basis of the left and right action stipulation lines 108 included in the external environment recognition information Ipr and the generated polygon target 110. For example, if the target 200 is the stationary object 204, the actions for the polygon target 110 may be classified into four patterns of [1] left avoidance, [2] right avoidance, [3] stop, and [4] disregard. For example, if the extraction information Ip indicates the moving object 202, the actions for the polygon target 110 may be classified into five patterns of [1] left avoidance, [2] right avoidance, [3] stop, [4] disregard, and [5] following.

Specifically, for the polygon target 110 that is separated from the left and right action stipulation lines 108 by a predetermined distance or more toward the outside in the width direction on the virtual plane coordinates SC, such as the polygon target 110 surrounded by a frame A1 in FIG. 7, the classification determination unit 81 classifies the action into [4] disregard. This is because the polygon target 110 that is outside the left and right action stipulation lines 108 is less likely to affect the travel of the host vehicle 11. Note that if the polygon target 110 overlaps with the left and right action stipulation lines 108 (see frame A2 in FIG. 7), the action is not classified into [4] disregard, and the polygon target 110 is regarded as the object to be avoided.

Moreover, the classification determination unit 81 calculates a width BW for each point sequence of the left and right recognition lines 104 in order to determine the action classification of the host vehicle 11 by using the travel possible width of the left and right recognition lines 104. For example, if the polygon target 110 exists inside the left and right recognition lines 104 on the virtual plane coordinates SC and each width BW from the polygon target 110 to the left and right recognition lines 104 is less than a certain value, such as the polygon target 110 surrounded by a frame B1 in FIG. 7, it is regarded that the polygon target 110 is unavoidable and the action is classified into the [3] stop. In this case, if the closest polygon target 110 ahead of the host vehicle 11 is regarded as the moving object 202 that moves in the same direction as the host vehicle 11, the action is classified into [5] following. It is preferable that the certain value to be compared with the width BW is set to an appropriate value in accordance with the vehicle width of the host vehicle 11.

Furthermore, if the polygon target 110 is on the right side or the left side of the center line 106 and the width BW between the polygon target 110 and the recognition line 104 on the side opposite to the side where the polygon target 110 exists is more than or equal to the certain value, the classification determination unit 81 determines that the host vehicle 11 should avoid the polygon target 110. For example, it is assumed that a polygon target 110α on the right side of the center line 106 is detected as shown by a dotted line in FIG. 7. In this case, if the width BW from the polygon target 110α to the left recognition line 104L is more than or equal to the certain value, the action is classified into [1] left avoidance. To the contrary, it is assumed that a polygon target 110β on the left side of the center line 106 is detected as shown by a dotted line in FIG. 7. In this case, if the width BW from the polygon target 110β to the right recognition line 104R is more than or equal to the certain value, the action is classified into [2] right avoidance.

The action classification for each polygon target 110 by the classification determination unit 81 is correlated with each polygon target 110 as action classification information, and this information is used for the subsequent process performed in the local environment map generation unit 54. In addition, the action classification information may be output to the long-term trajectory generation unit 71, the medium-term trajectory generation unit 72, and the short-term trajectory generation unit 73 through the integrated control unit 70, and used as information that limits the range of a plurality of trajectory patterns.

Figure 8A:
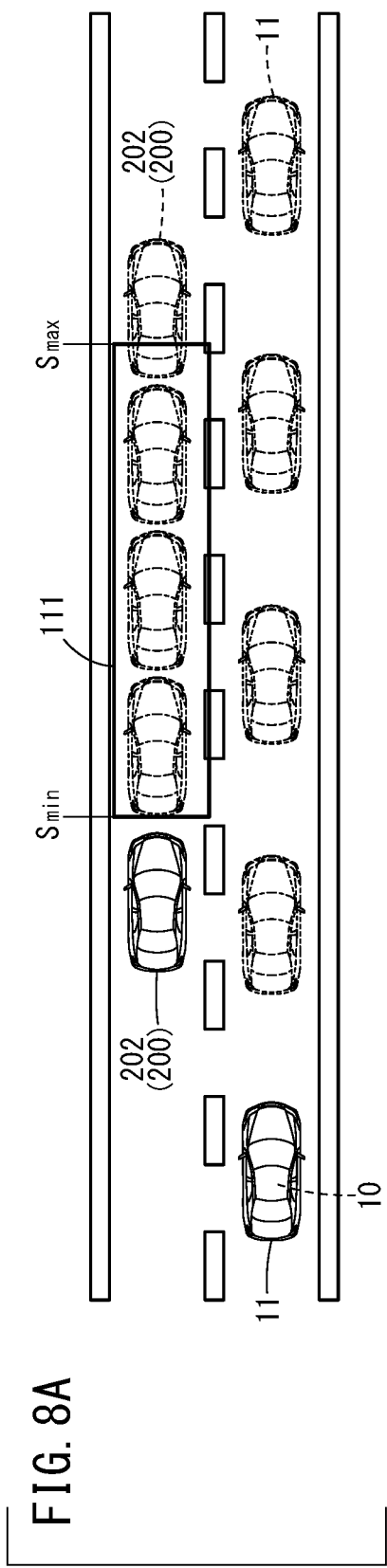
FIG. 8A is an explanatory diagram for describing a predicted polygon target of a moving object.

As illustrated in FIG. 8A, if the external environment recognition information Ipr includes the moving object 202, the target recognition action unit 80 according to the present embodiment generates a predicted polygon target 111 in consideration of time elapse on the virtual plane coordinates SC. For example, if another vehicle is traveling around the host vehicle 11, the target recognition action unit 80 estimates, in addition to the polygon of the other vehicle in the current situation, the polygon when the host vehicle 11 comes close to the other vehicle, in consideration of the speed of the other vehicle, and forms a series of polygons for the moving object 202.

Specifically, the target recognition action unit 80 calculates a relative distance with lapse of time on the basis of a predicted trajectory of the moving object 202 for which the action is classified into [1] left avoidance or [2] right avoidance and an output trajectory (long-term trajectory Lt, medium-term trajectory Mt, short-term trajectory St) of the host vehicle 11 that is calculated previously. For example, the predicted trajectory can be calculated based on the previous detection position and the current detection position of the moving object 202, and the output trajectory of the host vehicle 11.

Figure 8B:
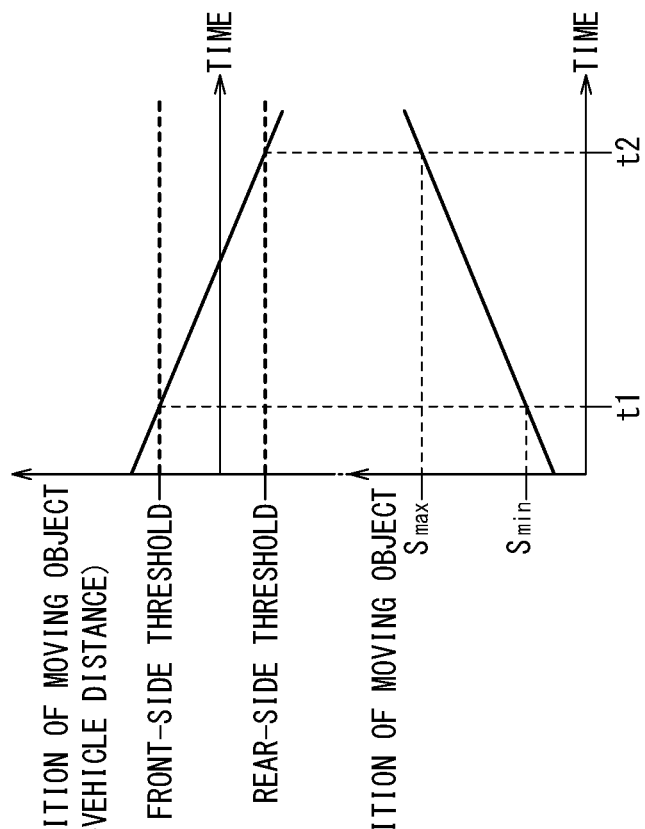
FIG. 8B is a graph for specifying the position of the moving object as time elapses.

For example, in an upper graph in FIG. 8B, a horizontal axis expresses time and a vertical axis expresses a relative position of the moving object 202 on the travel path. That is, the upper graph expresses the change over time of an inter-vehicle distance between the host vehicle 11 and the moving object 202. In this case, the current position of the moving object 202 at a time point t1 is positioned ahead of the host vehicle 11 (positive value). If the moving object 202 is slower than the host vehicle 11, the inter-vehicle distance inclines downward as time elapses. The target recognition action unit 80 includes a front-side threshold and a rear-side threshold corresponding to the inter-vehicle distance in advance. The target recognition action unit 80 extracts a region between the front-side threshold and the rear-side threshold and calculates the maximum value and the minimum value of the position of the moving object 202 on the lane (absolute position).

As illustrated in a lower graph in FIG. 8B, the absolute position of the moving object 202 becomes $S_{min}$ that is the lowest at the time point t1, and becomes $S_{max}$ that is the highest at a time point t2. By calculating $S_{min}$ and $S_{max}$, the target recognition action unit 80 estimates an existence range of the moving object 202 on the virtual plane coordinates SC with lapse of time (time point t1 to t2), and generates the predicted polygon target 111 in this existence range. Thus, the classification determination unit 81 can determine the action of the host vehicle 11 in accordance with the predicted polygon target 111.

Referring back to FIG. 4, the border line generation unit 82 of the local environment map generation unit 54 generates the left and right border lines 112 (a left border line 112L, a right border line 112R) (that is, performs step S20 in FIG. 5). The left and right border lines 112 are generated using the polygon target 110 and the action classification information generated by the target recognition action unit 80, and the center line 106 and the left and right action stipulation lines 108 in the external environment recognition information Ipr. The border line generation unit 82 extracts, for each coordinate point of the center line 106, a positional relation between the polygon target 110 and the left and right action stipulation lines 108 so as to generate the left and right border lines 112.

Figure 9:
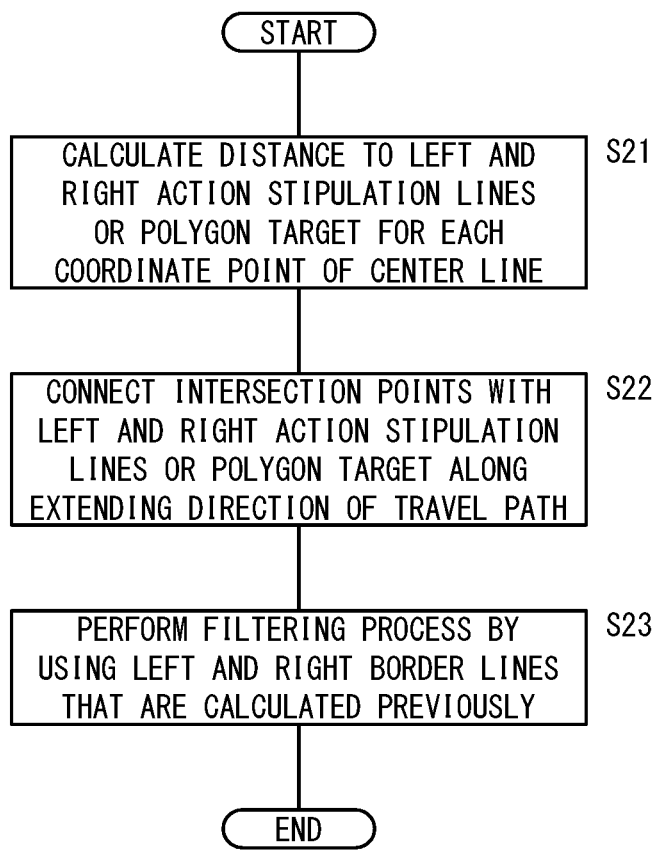
FIG. 9 is a flowchart that shows a procedure in which a border line generation unit generates left and right border lines.

Specifically, the border line generation unit 82 sequentially performs processes in accordance with the procedure in FIG. 9. First, the border line generation unit 82 calculates, for each coordinate point of the center line 106, the distance in the left-right width direction (normal direction) from the center line 106 to the left and right action stipulation lines 108 or the polygon target 110 (step S21). Next, the border line generation unit 82 connects intersection points of a normal line that extends from each coordinate point of the center line 106 in the left-right width direction with the left and right action stipulation lines 108 or the polygon target 110 (step S22). Moreover, the border line generation unit 82 performs a filtering process by using the left and right border lines 112 that are calculated previously (step S23). The specific content of the process of each step is hereinafter described.

Step S21 is a process in which the positional relation between the left and right action stipulation lines 108 and the polygon target 110 on the virtual plane coordinates SC is recognized. On the basis of the action classification information, the border line generation unit 82 recognizes whether each polygon target 110 exists on the left side or the right side of the center line 106, and calculates distances DL, DR from the center line 106 to the polygon target 110 on the side where the polygon target 110 is recognized to exist.

Figure 10B:
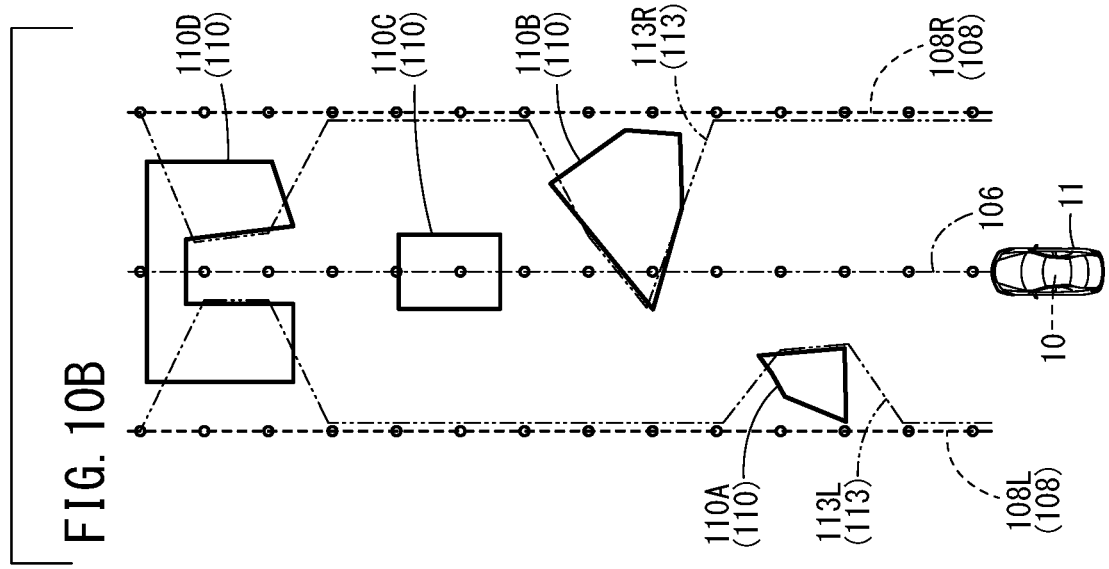
FIG. 10B is an explanatory diagram for describing a second process in which the left and right border lines are generated.
Figure 10A:
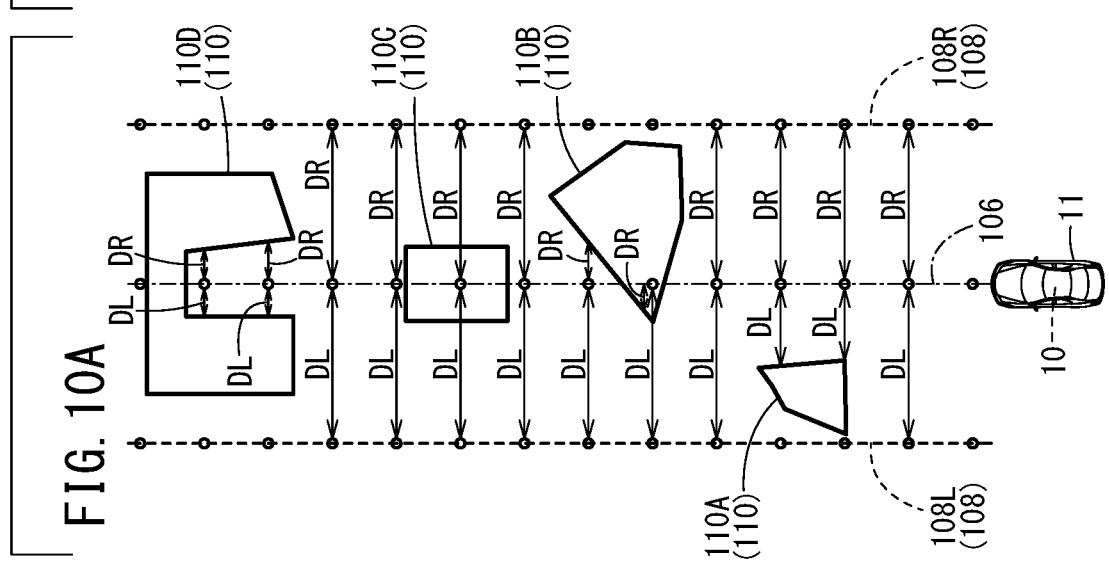
FIG. 10A is an explanatory diagram for describing a first process in which the left and right border lines are generated.

For example, it has been recognized that a first polygon target 110A in FIG. 10A is positioned on the left side of the center line 106 on the basis of the action classification information. Thus, the border line generation unit 82 calculates the distance DL from the coordinate point of the center line 106 to the intersection point with the first polygon target 110A that is positioned on the left side in the normal direction. On the other hand, since the first polygon target 110A does not exist on the right side of the center line 106, the border line generation unit 82 calculates the distance DR from the coordinate point of the center line 106 to the right action stipulation line 108R on the right side in the normal direction. To simplify the subsequent processes, it is preferable that one of the distance DL and the distance DR is calculated as a positive value and the other is calculated as a negative value. In the present embodiment, the distance on the right side of the center line 106 is calculated as a negative value.

Moreover, for example, a second polygon target 110B in FIG. 10A is positioned on the right side of the center line 106 while overlapping with the center line 106. In this case, the border line generation unit 82 calculates the distance DL from the coordinate point of the center line 106 to the left action stipulation line 108L, and also calculates the distance DR from the center line 106 to the intersection point of the normal line that extends toward the left side with the second polygon target 110B. The distance DR in this case is a positive value.

Furthermore, for example, if the polygon target 110 for which "stop" is recognized in the action classification information is present, the border line generation unit 82 changes a method for calculating the distance on the basis of the shape of the polygon target 110. Specifically, if the polygon target 110 does not have a concave part near the center line 106 such as a third polygon target 110C in FIG. 10A, the third polygon target 110C is disregarded and the distances DL, DR from the coordinate point of the center line 106 to the left and right action stipulation lines 108 on the outside in the width direction are calculated. This is because the third polygon target 110C is an element that may cause the host vehicle 11 to stop, but does not become the polygon target 110 that forms the left and right border lines 112.

On the other hand, if the polygon target 110 has the concave part near the center line 106 such as a fourth polygon target 110D in FIG. 10A, the distances DL, DR from the coordinate point of the center line 106 to the inside of the fourth polygon target 110D are calculated. As described above, the polygon target 110 is formed as a series of polygons integrating the plurality of targets 200 by the target recognition action unit 80. At this time, for example, if the target 200 (another vehicle or the like) is extracted on each of the left and right sides, the fourth polygon target 110D including the concave part may be formed. Thus, if the fourth polygon target 110D including the concave part is present ahead of the host vehicle 11, there is a high possibility that the actual targets 200 (the moving objects 202 or the like) exist on the left and right sides of the concave part. Thus, similarly to the case where the polygon target 110 exists in the width direction of the center line 106, the distances DL, DR from the center line 106 in the normal direction are determined.

Note that, for example, if the polygon target 110 does not exist in the width direction of the coordinate point of the center line 106, the maximum distance (the distance DL from the center line 106 to the left action stipulation line 108L, the distance DR from the center line 106 to the right action stipulation line 108R) is calculated.

Step S22 is a process in which the polygon target 110 and the left and right action stipulation lines 108 are correlated with each other for each coordinate point of the center line 106. As illustrated in FIG. 10B, the border line generation unit 82 connects, along an extending direction of the travel path, the intersection points of the normal line that extends from each coordinate point of the center line 106 in the left-right width direction with the left and right action stipulation lines 108 or the polygon target 110. Thus, on both the left and right sides on the travel path, left and right temporary border lines 113 (left temporary border line 113L, right temporary border line 113R) that are winding in accordance with the existence of the polygon target 110 are formed once.

As illustrated in FIG. 10C, step S23 is a process in which the fixed left and right border lines 112 are generated on the basis of the left and right temporary border lines 113. The border line generation unit 82 performs the filtering process by using the left and right border lines 112 that are generated previously. That is to say, an interference part between each polygon target 110 and the temporary border lines 113 is eliminated by correcting the temporary border lines 113 by overlapping the current left and right temporary border lines 113 with the previous left and right border lines 112. Thus, the left and right border lines 112 (the left border line 112L, the right border line 112R) that divide collision and non-collision with the polygon target 110 are obtained.

These left and right border lines 112 each express a continuous line that changes for each coordinate point so that the polygon target 110 is positioned on the outside. Moreover, in the left and right border lines 112, noise or the like included in the left and right temporary border lines 113 is removed. Then, the border line generation unit 82 outputs the left and right border lines 112 generated by the process of and before step S23 to the recommended travel path generation unit 84, in addition to the integrated control unit 70.

The recommended travel path generation unit 84 generates the left and right recommended border lines 100 and the recommended travel route 102 on the basis of the left and right border lines 112 received from the border line generation unit 82, and the left and right recognition lines 104, the left and right action stipulation lines 108, and the polygon target 110 included in the external environment recognition information Ipr. As described above, the left and right recommended border lines 100 are borders that allow the host vehicle 11 to move with the margin for the target 200.

Figure 11:
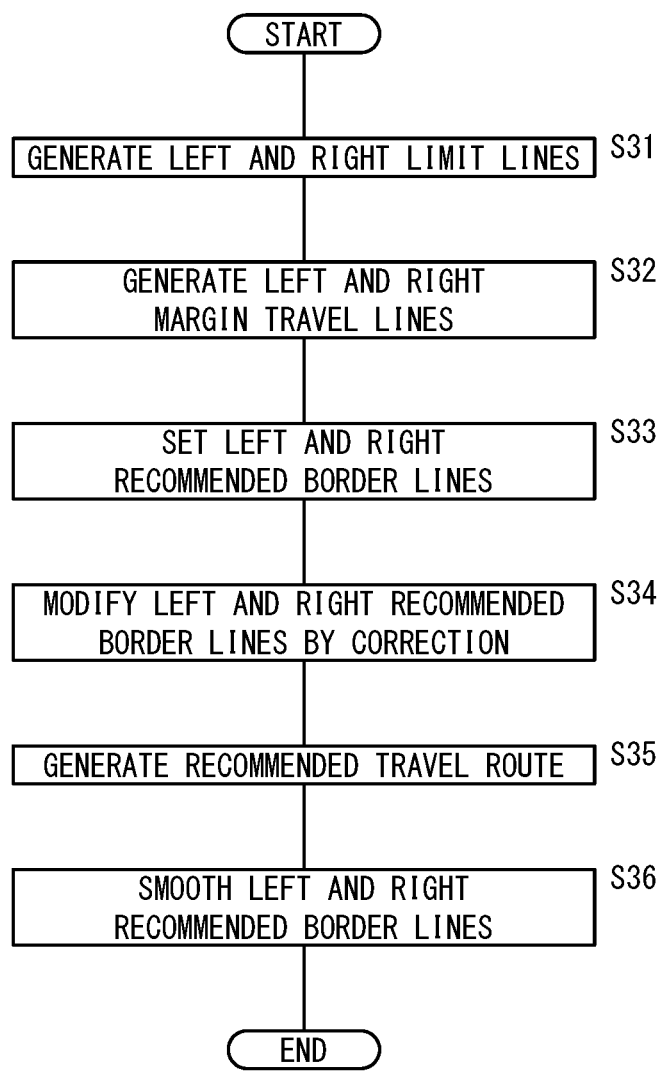
FIG. 11 is a flowchart that shows a procedure in which a recommended travel path generation unit generates the left and right recommended border lines and the recommended travel route.

Specifically, processes in accordance with the procedure in FIG. 11 are performed sequentially. That is to say, the recommended travel path generation unit 84 generates left and right limit lines 118 on the basis of the left and right recognition lines 104 (step S31), and generates left and right margin travel lines 120 on the basis of the left and right border lines 112 (step S32). Then, the recommended travel path generation unit 84 sets inner lines among the left and right limit lines 118 and the left and right margin travel lines 120 as the left and right recommended border lines 100 (step S33). Moreover, the recommended travel path generation unit 84 modifies a part where the left and right recommended border lines 100 are close to each other (including intersection) by correction (step S34). After that, the recommended travel path generation unit 84 generates the recommended travel route 102 on the basis of the left and right recommended border lines 100 (step S35), and smooths the left and right recommended border lines 100 on the basis of this recommended travel route 102 (step S36). The specific content of the process of each step is hereinafter described.

Figure 12A:
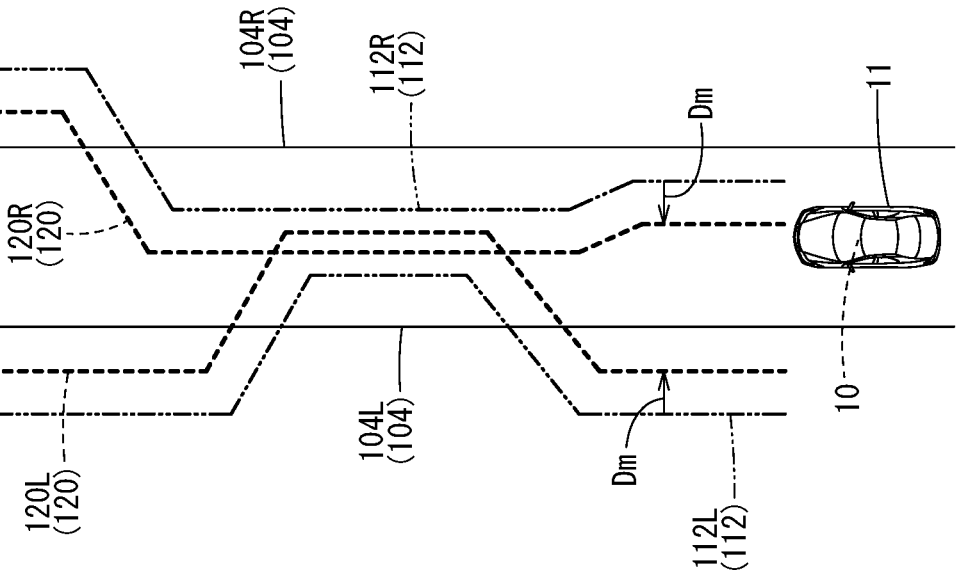
FIG. 12A is an explanatory diagram for describing a process in which left and right limit lines are generated.

Step S31 is a process in which a protrusion allowable range from the lane marking or the like is set in a travel lane of the travel path where the host vehicle 11 travels. As illustrated in FIG. 12A, the generated left and right limit lines 118 (a left limit line 118L, a right limit line 118R) express a deviation possible range depending on the left and right recognition lines 104, and express borders to prevent the host vehicle 11 from deviating from the limit lines 118 toward the outside.

The recommended travel path generation unit 84 generates the left and right limit lines 118 by adding, to the left and right recognition lines 104, an appropriate allowable interval D2 that is deviated toward the outside in the width direction. For example, if the lane markings of the travel lane are extracted as the left and right recognition lines 104, the left and right limit lines 118 are obtained by adding the allowable interval D2 such as 0.5 m or 1 m to the outside of the lane marking in the width direction. Note that, for example, if the road shoulder of the travel path is extracted, the left and right limit lines 118 including a predetermined range of the road shoulder may be obtained.

Figure 12B:
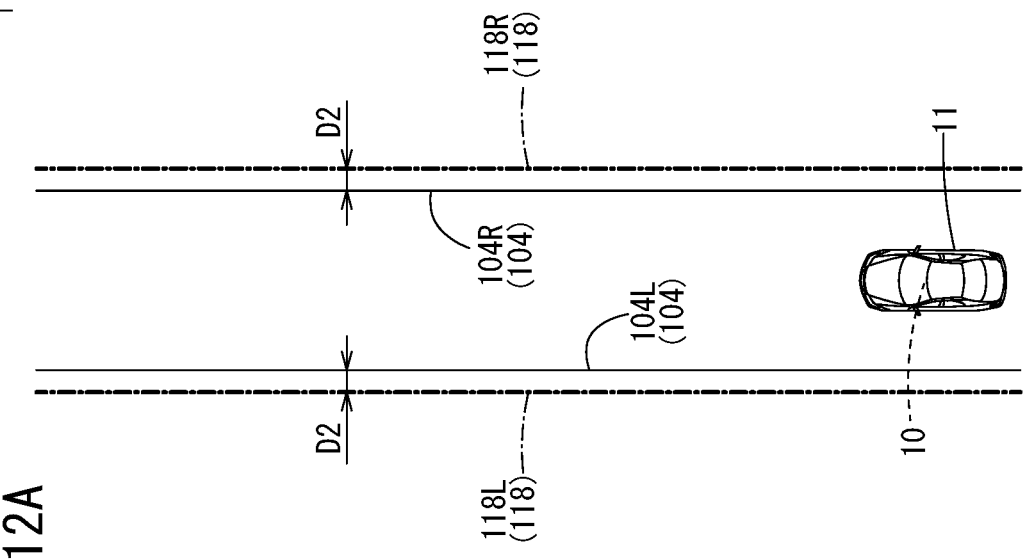
FIG. 12B is an explanatory diagram for describing a process in which left and right margin travel lines are generated.

Step S32 is performed in order to set left and right ranges enabling the host vehicle 11 to travel comfortably while hardly approaching the target 200 that exists in the peripheral environment of the host vehicle 11. As illustrated in FIG. 12B, the calculated left and right margin travel lines 120 (a left margin travel line 120L, a right margin travel line 120R) express borders that depend on the left and right border lines 112 and are separated at a certain distance from the left and right border lines 112 toward the inside in the width direction.

The recommended travel path generation unit 84 generates the left and right margin travel lines 120 by adding the predetermined margin interval Dm (margin) to the left and right border lines 112. Examples of the margin interval Dm include 0.5 m and 1 m. Note that the recommended travel path generation unit 84 may change the margin interval Dm in accordance with each element such as the left and right action stipulation lines 108 forming the left and right border lines 112 or the polygon target 110.

As illustrated in FIG. 13, step S33 is a process in which the left and right recommended border lines 100 (a left recommended border line 100L, a right recommended border line 100R) are temporarily set by comparing the left and right limit lines 118 with the left and right margin travel lines 120 and prioritizing the lines on the inner side based on the host vehicle 11. The calculated left and right recommended border lines 100 express target borders where the host vehicle 11 passes positions at a distance from the stationary object 204 or the moving object 202 without greatly deviating from the travel lane. Thus, in the automated driving of the host vehicle 11, it is preferable that the host vehicle 11 travels inside these left and right recommended border lines 100 as much as possible.

The recommended travel path generation unit 84 compares the left and right limit lines 118 generated in step S31 with the left and right margin travel lines 120 generated in step S32, and selects the lines that exist on the inner side. Thus, in a range where the margin travel line 120 exists on the inside of the limit line 118 on the travel path, the margin travel line 120 is the recommended border line 100. On the other hand, in a range where the limit line 118 exists on the inside of the margin travel line 120 on the travel path, the limit line 118 is the recommended border line 100. By this process, the recommended border line 100 is positioned on the limit line 118 or on the inside of the limit line 118. Note that the recommended border line 100 is preferably generated as a point sequence in which the coordinate points are arranged at intervals on the virtual plane coordinates SC, similarly to the recognition line 104 or the like.

Figure 14A:
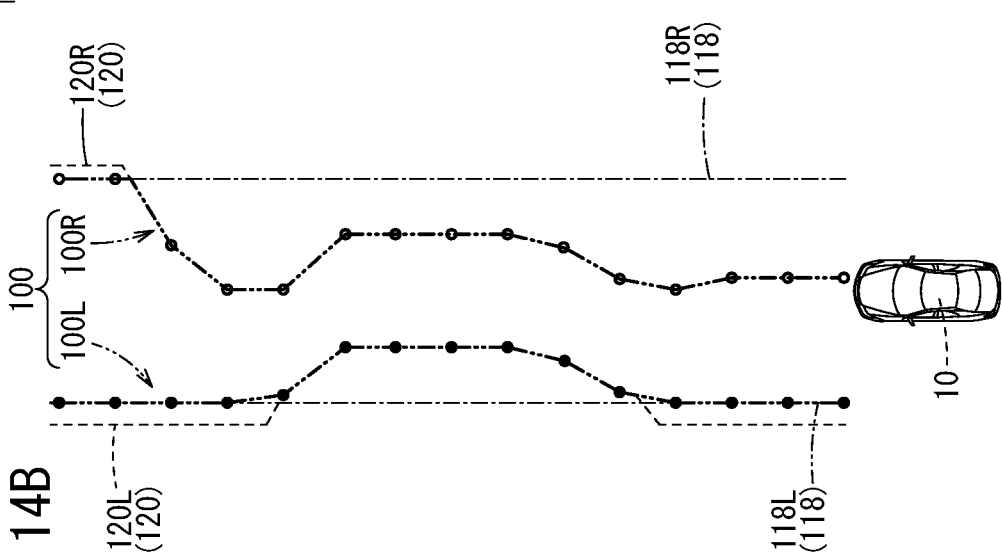
FIG. 14A is an explanatory diagram for describing the left and right recommended border lines before correction.

Step S34 is a process in which, regarding the calculated left and right recommended border lines 100 described above, the left and right recommended border lines 100 are modified in order to respond to a section where the host vehicle 11 cannot travel as illustrated in FIG. 14A. Thus, in the left and right recommended border lines 100, problems such as a narrow route and a reversed route (the left recommended border line 100L is positioned on the right side of the right recommended border line 100R) are solved (also see FIG. 14B).

As a specific process, first, an interval in the width direction (hereinafter, a recommended border interval Db) is calculated for each coordinate point of the left and right recommended border lines 100. The recommended travel path generation unit 84 includes a threshold Th in advance. The recommended travel path generation unit 84 compares each of the calculated recommended border intervals Db with the threshold Th. If the recommended border interval Db is less than or equal to the threshold Th (including the case where the left and right recommended border lines 100 are reversed), the recommended travel path generation unit 84 modifies the coordinate point. The threshold Th is not limited to a particular value, and is preferably a value obtained by adding a small width margin to the vehicle width of the host vehicle 11, for example.

Situations in which the left and right recommended border lines 100 are modified are classified into the following patterns of [a] to [c].

[a] Both the left and right recommended border lines 100 exist on the inside of the left and right limit lines 118 (see line A in FIG. 14A).

[b] The left recommended border line 100L and the right recommended border line 100R are reversed (see line B in FIG. 14A).

[c] One of the left and right recommended border lines 100 overlaps on one of the left and right limit lines 118, and the other recommended border line 100 exists on the inside of the other of left and right limit lines 118 (see line C in FIG. 14A).

Figure 15A:
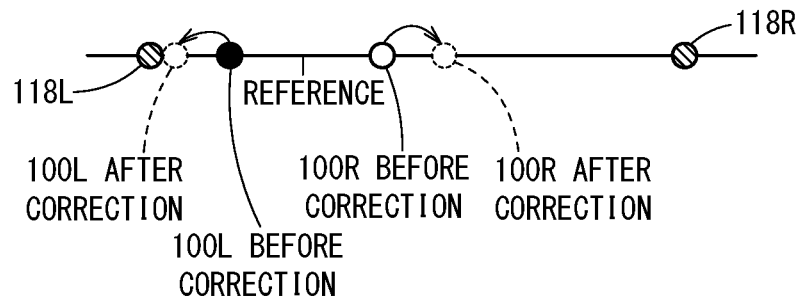
FIG. 15A to FIG. 15D are explanatory diagrams for describing the content of the correction for the left and right recommended border lines.

If [a] both the left and right recommended border lines 100 exist on the inside of the left and right limit lines 118, the left and right recommended border lines 100 can be moved toward outside in the width direction. Thus, as illustrated in FIG. 15A, the recommended travel path generation unit 84 performs a process of moving the left and right recommended border lines 100 toward the outside in the width direction on the basis of the center between the left and right recommended border lines 100 in the width direction. By this correction, the width between the left and right recommended border lines 100 becomes equal to the threshold Th or wider than the threshold Th to some extent.

Figure 15B:
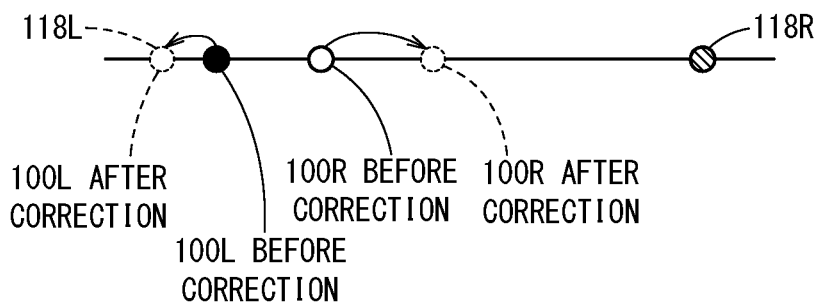

Moreover, if one of the recommended border lines 100 overlaps with one of the limit lines 118 (or the border lines 112) due to the moving of the left and right recommended border lines 100 toward the outside, the other recommended border line 100 is moved further toward the outside. That is to say, the left and right recommended border lines 100 can be moved to the limit lines 118 (or the border lines 112) at maximum toward the outside in the width direction. As illustrated in FIG. 15B, for example, it is assumed that the left recommended border line 100L before the correction is positioned near the left limit line 118L, and the right recommended border line 100R before the correction is separated from the right limit line 118R (or the right border line 112R) with a margin. In this case, the left recommended border line 100L is moved to the left limit line 118L (or a position that is slightly inside of the left limit line 118L). On the other hand, the right recommended border line 100R is moved greatly toward the outside. Thus, the border to be in contact with the target 200 or the like is not shown in the left and right recommended border lines 100 after the correction.

Figure 15C:
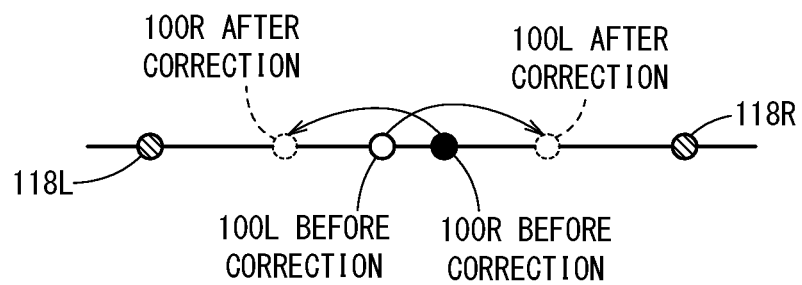

If [b] the left recommended border line 100L and the right recommended border line 100R are reversed, it is assumed that each of the left and right recommended border lines 100 can be moved toward the outside in the width direction as illustrated in FIG. 15C. Thus, even in [b], the recommended travel path generation unit 84 performs the process of moving the left recommended border line 100L to the left direction and moving the right recommended border line 100R to the right direction, similarly to [a]. Note that the left recommended border line 100L and the right recommended border line 100R are moved more greatly toward the outside than in the case in [a]. For example, it is preferable that, on the basis of the center between the left and right recommended border lines 100 in the width direction regardless of the reversed part, one of the recommended border lines 100 is moved toward the outside by half of the threshold Th, and the other recommended border line 100 is moved toward the outside by half of the threshold Th. Thus, even in the part where the left and right recommended border lines 100 are reversed, the recommended border lines 100 are modified so that the host vehicle 11 can travel.

Figure 15D:
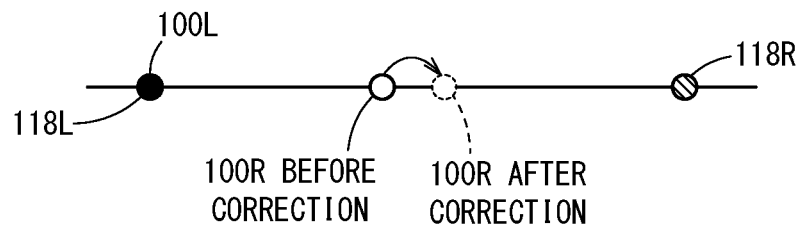

If [c] one of the left and right recommended border lines 100 overlaps on one of the left and right limit lines 118, and the other recommended border line 100 exists on the inside of the other of the left and right limit lines 118, only the other one of the left and right recommended border lines 100 can be moved toward the outside in the width direction. Thus, as illustrated in FIG. 15D, on the basis of the one recommended border line 100 that overlaps with one of the left and right limit lines 118, the recommended travel path generation unit 84 performs the process of moving the other recommended border line 100 toward the outside in the width direction. Thus, the left and right recommended border lines 100 are corrected so that the host vehicle 11 avoids the target 200 while approaching the side of the one recommended border line 100 as much as possible.

Figure 14B:
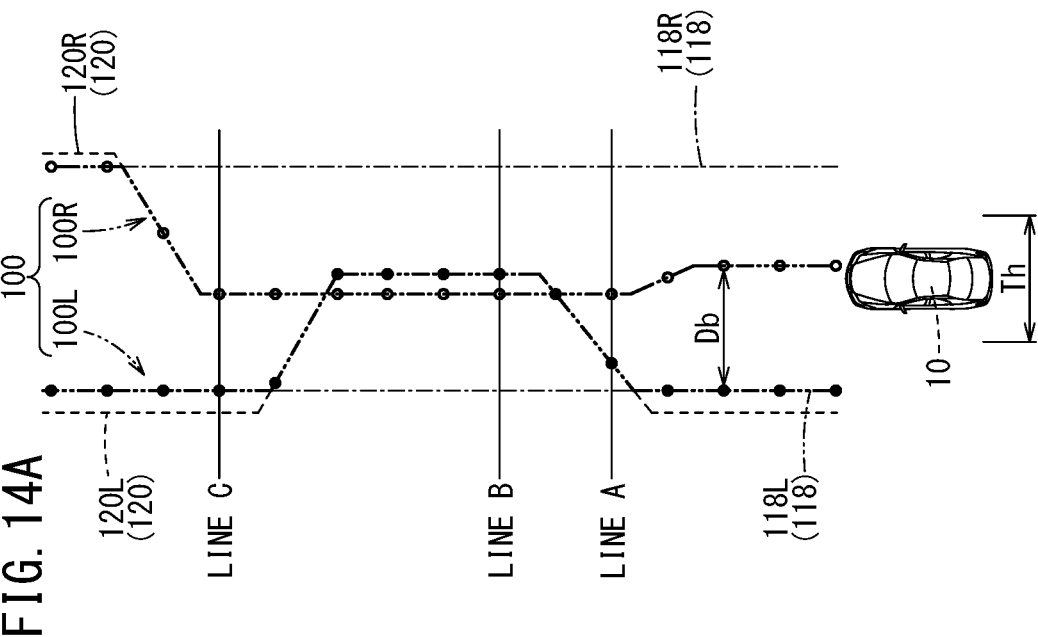
FIG. 14B is an explanatory diagram for describing the left and right recommended border lines after the correction.

By the above process, the recommended travel path generation unit 84 can perform the correction from the left and right recommended border lines 100 before the correction in FIG. 14A to the left and right recommended border lines 100 after the correction in FIG. 14B. That is to say, by the correction, the left recommended border line 100L and the right recommended border line 100R are disposed at positions where these lines do not intersect and are separated from each other.

Referring back to FIG. 11, in step S35, the recommended travel route 102 when the host vehicle 11 travels is generated by using the left and right recommended border lines 100 (point sequence) generated in the above processes. The recommended travel route 102 is the travel route of the host vehicle 11 in which, for example, the curvature is minimized, the distance is minimized, and the difference from the center line 106 is minimized, and is a route in consideration of the travel efficiency and the comfortability of the host vehicle 11. One example of a method for calculating the recommended travel route 102 is hereinafter described.

As illustrated in FIG. 16, first, the recommended travel path generation unit 84 calculates an interpolation line 122 by an appropriate interpolation method using the recommended travel route (not shown) that is calculated previously. Moreover, the recommended travel path generation unit 84 sets a plurality of intersections where the interpolation line 122 intersects line segments that connect pairs of left and right coordinate points of the left and right recommended border lines 100, as restriction points X corresponding a target where the host vehicle 11 travels. In the virtual plane coordinates SC, the point sequence of the left recommended border line 100L is expressed by (Lx, Ly)×N, the point sequence of the right recommended border line 100R is expressed by (Rx, Ry)×N, and the point sequence of the restriction points X is expressed by (x, y)×N. The point sequence of the restriction points X is expressed by the following expressions (1), (2).

$$x_i = Rx_i + \alpha_i(Lx_i - Rx_i) \quad (1)$$

$$y_i = Ry_i + \alpha_i(Ly_i - Ry_i) \quad (2)$$

in which $$0 \leq \alpha_i \leq 1, i \in [0, N-1]$$

After the setting, the point sequence of the restriction points is formulated, and an objective function and a constraint condition regarding a formulated parameter (optimization variable) are formulated as a convex quadratic programming problem (nonlinear programming problem). The convex quadratic programming problem is expressed by the expression (3) below, and the constraint condition is expressed by the expressions (4), (5) below.

$$J = \tfrac{1}{2} x' H x + q' x \quad (3)$$

$$A_{eq} x = b_{eq} \quad (4)$$

$$A_{in} x \leq b_{in} \quad (5)$$

In this case, in the equality constraint condition in (4), the restriction points are used. In the inequality constraint condition in (5), an upper limit value and a lower limit value of the optimization variable in consideration of the vehicle width of the host vehicle 11 and a lane width calculated based on the left and right recommended border lines 100 are used. Then, in the convex quadratic programming problem, a parameter x, which minimizes J in the expression (6) to the expression (8) in the formula 1 that are the objective function, is calculated.

[Expression 1]

$$J = \sum_{i=1}^{N-2} \left( \left( \frac{d^2 x_i}{ds^2} \right)^2 + \left( \frac{d^2 y_i}{ds^2} \right)^2 \right) \quad (6)$$

$$J = \sum_{i=1}^{N-1} ((x_i - x_{i-1})^2 + (y_i - y_{i-1})^2) \quad (7)$$

$$J = \sum_{i=0}^{N} (0.5 - a_i)^2 \quad (8)$$

Here, the expression (6) is the objective function that minimizes the curvature in the point sequence of the restriction points X, the expression (7) is the objective function that minimizes the distance of the point sequence of the restriction points X, and the expression (8) is the objective function that minimizes the difference between the point sequence of the restriction points X and the center line 106. When the expressions (6) to (8) are transformed into the expression (3), H, q are calculated in each expression (that is to say, Hc and qc that minimize curvature, Hs and qs that minimize distance, Ht and qt that minimize the difference from center line 106 are obtained).

Then, the recommended travel path generation unit 84 uses predetermined weights Wc, Ws, Wt to define the objective function that integrates three conditions as the following expression (9). The parameter x that minimizes J_all corresponds to the final recommended travel route 102 (in which the curvature is minimized, the distance is minimized, and the difference from center line 106 is minimized).

$$J\_all = \tfrac{1}{2} x' H\_all x + q\_all' x \quad (9)$$

in which $H\_all = Wc * Hc + Ws * Hs + Wt * Ht$ $q\_all = Wc * qc + Ws * qs + Wt * qt$ $x = \{a0, a1, \ldots, aN-1\}$ Note that it is preferable that the weights Wc, Ws, Wt are changed as appropriate in the local environment map generation unit 54 in accordance with the situation of the host vehicle 11. For example, if the curvature of the travel path is large or the travel path is winding, the more favorable route can be obtained by increasing Wc for minimizing the curvature, for example.

Referring back to FIG. 11, in step S36, the left and right recommended border lines 100 are further smoothed by using the recommended travel route 102 generated in step S35 and the left and right recognition lines 104. Thus, the left and right recommended border lines 100 smoothly continue without forming an extreme large width in accordance with the traveling of the host vehicle 11. Note that step S36 may be omitted.

As illustrated in FIG. 17A and FIG. 17B, in the smoothing process, the recommended travel path generation unit 84 revises (resets) the width for each coordinate point of the recommended travel route 102 so that the recommended travel route 102 is approximately positioned in the center. That is to say, for each coordinate point of the recommended travel route 102, a left-side width WL to the left recommended border line 100L and a right-side width WR to the right recommended border line 100R are compared, and the width is set to the smaller width.

For example, in FIG. 17B in which a line D in FIG. 17A is enlarged, the left-side width WL is larger than the right-side width WR in the width direction (normal direction). Thus, the width of the left-side width WL is changed to that of the right-side width WR (see sign WL' in FIG. 17B) so that the coordinate point of the left recommended border line 100L is moved toward the right.

Moreover, as indicated by a line E in FIG. 17A, if the coordinate point of the recommended travel route 102 exists on the inside of the left and right recognition lines 104 and the coordinate points of the left and right recommended border lines 100 exist on the outside of the left and right recognition lines 104, the recommended travel path generation unit 84 performs a process different from the above process. Specifically, the left and right recognition lines 104 and the left and right recommended border lines 100 are compared. If the left and right recommended border lines 100 can be inserted between the left and right recognition lines 104, one of the left and right recommended border lines 100 (to which the recommended travel route 102 is close) is overlapped with the recognition line 104. Then, the width between the recommended travel route 102 and the other of the left and right recommended border lines 100 (which is far from recommended travel route 102) is set to be equal to the width between the recommended travel route 102 and the recommended border line 100 that overlaps with the recognition line 104.

After each coordinate point of the left and right recommended border lines 100 is modified in the above process, the recommended travel path generation unit 84 sets a final width for each coordinate point by selecting the minimum width on the basis of the width of the coordinate points before and after the recommended travel route 102 (the left-side width WL and the right-side width WR). For example, if the left and right recommended border lines 100 rapidly come close to each other or rapidly separate from each other, the recommended travel path generation unit 84 does not change the width rapidly but suppresses the change over the minimum value, so that the left and right recommended border lines 100 can be further smoothed.

Thus, the left and right recommended border lines 100 are corrected from a state where line segments that connect the coordinate points are winding to a state where the point sequence changes smoothly. Note that in the smoothing of the left and right recommended border lines 100, various method can be employed in addition to the above method. For example, the smoothing may be performed by calculating an angle of the line segments that connect the coordinate points of the left and right recommended border lines 100 and shifting the coordinate points so that the calculated angle becomes lower than or equal to a predetermined angle. Alternatively, the current left and right recommended border lines 100 may be smoothed by using a plurality of sets of the left and right recommended border lines 100 in the past.

After generating each piece of information (the left and right recommended border lines 100 and the recommended travel route 102) by the calculation in the above recommended travel process, the recommended travel path generation unit 84 outputs the information to the stop position generation unit 86, in addition to the integrated control unit 70. Note that it is preferable that the recommended travel path generation unit 84 additionally outputs, to the integrated control unit 70 and the stop position generation unit 86, information including the left and right limit lines 118 generated in the processing process, for example.

In step S40 in FIG. 5, the stop position generation unit 86 receives the polygon target 110 and the action classification information from the target recognition action unit 80, and specifies the vehicle stop position 114 where the host vehicle 11 stops. Specifically, as illustrated in FIG. 18, the stop position generation unit 86 disposes the left and right limit lines 118 and the polygon target 110 on the virtual plane coordinates SC so as to specify the relative position between the left and right limit lines 118 and the polygon target 110.

Then, the stop position generation unit 86 calculates a travel possible area on the virtual plane coordinates SC on the basis of the polygon target 110 for which [1] left avoidance, [2] right avoidance, and [3] stop are recognized as the action classification information. The normal line is extended from each coordinate point of the recommended travel route 102 on the virtual plane coordinates SC, so that the travel possible area can be set by the distance to the intersection point (coordinate point) of the normal line with the left and right limit lines 118 or the polygon target 110. In addition, the travel possible area may be obtained by subtracting the polygon target 110 (travel impossible area) from an inner area of the left and right limit lines 118.

For example, if the polygon target 110 exists in each side in the left-right width direction, a space width Wi between the two polygon targets 110 and the vehicle width of the host vehicle 11 are compared. Then, if the space width Wi between the two polygon targets 110 is larger than the vehicle width of the host vehicle 11, it is assumed that the travel possible area is already secured at the coordinate point. On the other hand, if the space width Wi between the two polygon targets 110 is smaller than the vehicle width of the host vehicle 11, it is assumed that the travel possible area is not secured at the coordinate point, that is, the area is the travel impossible area (the vehicle stop position 114). Thus, the coordinate point is specified as the vehicle stop position 114.

Similarly, if the polygon target 110 exists in one side in the left-right width direction at the coordinate point of the recommended travel route 102, the space width Wi from one of the left and right limit lines 118 (the limit line 118 on the avoidance side) to the polygon target 110 and the vehicle width of the host vehicle 11 are compared. Then, if the space width Wi is larger than the vehicle width of the host vehicle 11, it is assumed that the travel possible area is already secured at the coordinate point. On the other hand, if the space width Wi is smaller than the vehicle width of the host vehicle 11, it is assumed that the travel impossible area (the vehicle stop position 114) exists at that coordinate point.

After generating the vehicle stop position 114 by the above method, the stop position generation unit 86 outputs the vehicle stop position 114 to the target speed generation unit 88, in addition to each trajectory generation unit through the integrated control unit 70. As described above, the vehicle control device 10 can perform the stop operation for the target 200 accurately by resetting the vehicle stop position 114 in the stop position generation unit 86, in addition to the action classification information for the polygon target 110.

Note that the polygon target 110 for which the action is classified into the stop in the action classification information overlaps with the recommended travel route 102 or the left and right recommended border lines 100 on the virtual plane coordinates SC. Thus, this overlap position may be regarded as the vehicle stop position 114. Moreover, if the action for the polygon target 110 is classified into the left avoidance or the right avoidance, the stop position generation unit 86 may determine whether the width is enough for the host vehicle 11 to pass on the basis of the left and right border lines 112 that have already been generated and specify the vehicle stop position 114.

Figure 19:
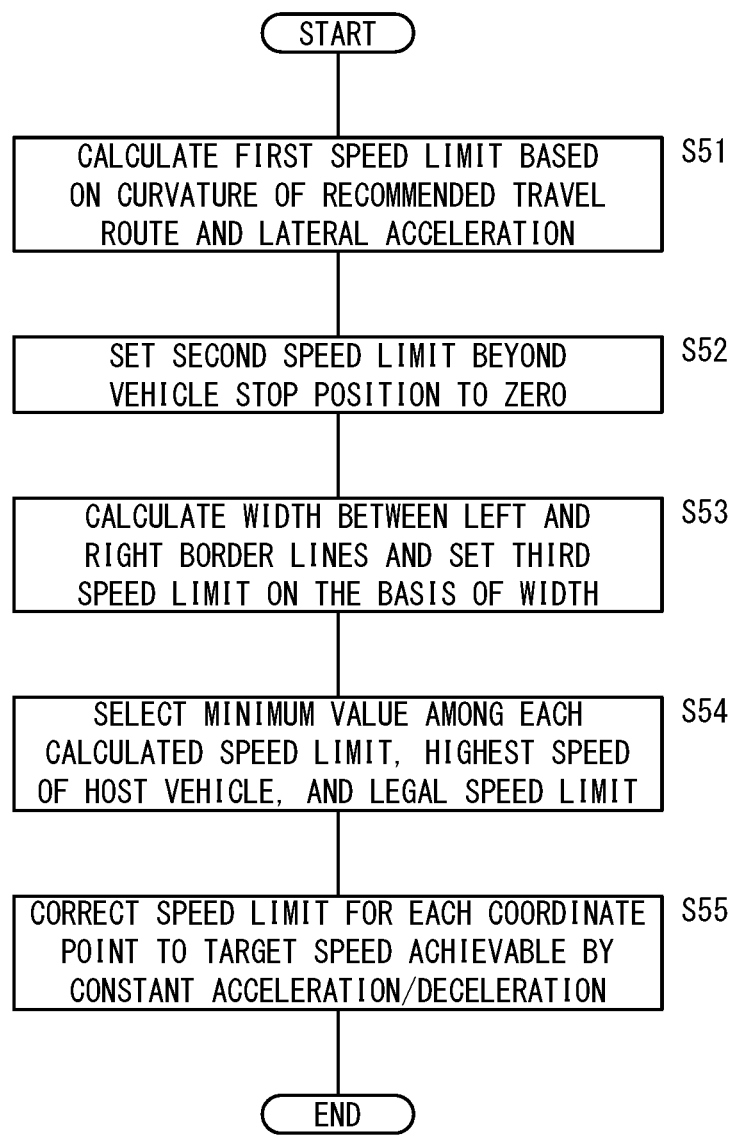
FIG. 19 is a flowchart that shows a procedure in which a target speed generation unit generates target speed.

In step S50 in FIG. 5, the target speed generation unit 88 of the local environment map generation unit 54 receives the left and right recommended border lines 100 and the host vehicle state information Ivh, and generates the target value of the speed (the target speed 116) on the recommended travel route 102. This target speed 116 is transmitted to each trajectory generation unit through the integrated control unit 70, and is used as an indicator when each trajectory generation unit calculates the trajectory including the speed. For example, the target speed generation unit 88 sequentially performs processes in accordance with the procedure in FIG. 19.

The target speed generation unit 88 calculates first speed limit in accordance with the curvature of the recommended travel route 102 and the lateral acceleration of the host vehicle 11 (acceleration in the vehicle width direction) (step S51). For example, the curvature of the recommended travel route 102 can be easily calculated on the basis of the angle between line segments of the recommended travel route 102 that connect the coordinate points. Moreover, the lateral acceleration is preferably estimated for each coordinate point of the recommended travel route 102 on the basis of the calculated curvature, the current speed, and the like. Thus, the first speed limit is set to a practical speed that reflects the situation of the travel path and the state of the host vehicle 11 during traveling.

In addition, if the vehicle stop position 114 has been specified (received), the target speed generation unit 88 sets second speed limit so that the second speed limit beyond the vehicle stop position 114 is zero (step S52). Thus, it is possible to prevent the host vehicle 11 from traveling over the vehicle stop position 114 (prevent the speed from becoming larger than zero).

Moreover, the target speed generation unit 88 sets third speed limit on the basis of the width between the left and right border lines 112 (step S53). As illustrated in FIG. 20A, if the width of the travel possible area (between the left and right border lines 112) around the host vehicle 11 is narrow, the target speed 116 corresponding to the lowered speed of the host vehicle 11 is set in this process. Thus, if the width between the left and right border lines 112 is narrow, the host vehicle 11 can travel with lower speed.

For example, the target speed generation unit 88 stores a width-speed limit table 90 (reference information) as shown in FIG. 20B in a target speed storage unit that is not shown. The speed limit, within which the vehicle occupant feels reassured, is obtained by experiments and the like, and is set and stored in advance in the width-speed limit table 90 for the width between the border lines 112. If the left and right border lines 112 are received, the target speed generation unit 88 calculates the width between the left and right border lines 112 for each coordinate point of the recommended travel route 102, and derives the speed limit in accordance with the calculated width with reference to the width-speed limit table 90. Thus, the appropriate speed limit can be obtained for each coordinate point.

After that, the target speed generation unit 88 selects the minimum speed for each coordinate point of the recommended travel route 102 among the first speed limit to third speed limit obtained in above steps S51 to S53, and the highest speed of the host vehicle and legal speed limit (step S54). Thus, the lowest speed can be obtained for each coordinate point of the generated recommended travel route 102.

Lastly, the target speed generation unit 88 corrects the speed limit for each coordinate point of the recommended travel route 102 obtained in the above step to the target speed 116 that can be achieved by constant acceleration/deceleration (step S55). Thus, the large acceleration or the deceleration of the host vehicle 11 can be suppressed, and it is possible to calculate the target speed 116 that enables the host vehicle 11 to travel stably.

By the above process, the local environment map generation unit 54 outputs the local environment information Iem including the polygon target 110, the left and right border lines 112, the left and right limit lines 118, the left and right recommended border lines 100, the recommended travel route 102, the vehicle stop position 114, the target speed 116, and the like. Thus, by using the local environment information Iem, each trajectory generation unit can narrow the generation range of the trajectory pattern to some extent (can calculate a route near the recommended travel route 102 with concentration, for example).

As described above, the vehicle control device 10 according to the present embodiment calculates the left and right recommended border lines 100 by adding the interval margin Dm to the left and right border lines 112 in the local environment map generation unit 54. These left and right recommended border lines 100 express the borders where the host vehicle 11 can travel with the margin for the various targets 200 on the travel path. Thus, the vehicle control device 10 can obtain the route compatible with the plurality of targets 200 on the basis of the left and right recommended border lines 100. Therefore, in the automated driving, it is possible to cause the host vehicle 11 to travel efficiently while reducing the possibility of interfering with the target 200 and the vehicle occupant's anxiety.

Moreover, the vehicle control device 10 is configured to correct the left and right recommended border lines 100 as appropriate. For example, by moving the left and right recommended border lines 100 toward the outside in the width direction, the vehicle control device 10 can suppress the occurrence of a trouble in the travel control of the host vehicle 11 due to the narrow interval between the generated left and right recommended border lines 100, for example. Especially, if the positions of the left recommended border line 100L and the right recommended border line 100R are reversed, the vehicle control device 10 performs a process of eliminating this reverse to favorably continue the travel control of the host vehicle 11. Moreover, if one of the left and right recommended border lines 100 overlaps with one of the left and right limit lines 118, the vehicle control device 10 moves only the other of the left and right recommended border lines 100 toward the outside in the width direction, whereby it is possible that the left and right recommended border lines 100 do not go beyond the limit lines 118. Thus, it is possible to suppress the generation of the route where the host vehicle 11 largely deviates from the travel path.

Then, by calculating the recommended travel route 102 in which the curvature, the travel distance, and the difference from the center of the left and right recommended border lines 100 are minimized, the vehicle control device 10 provides the target route in which the decrease of the vehicle speed of the host vehicle 11 or the useless movement in the steering can be suppressed. Thus, by adjusting the speed and the steering angle during traveling so as to match the recommended travel route 102 as much as possible, the vehicle control device 10 enables the host vehicle 11 to travel smoothly. Moreover, by adjusting the left and right recommended border lines 100 on the basis of the recommended travel route 102, the vehicle control device 10 can obtain the left and right recommended border lines 100 that smoothly continue. With these recommended border lines 100, the route that does not cause the unnatural behavior of the host vehicle 11 can be generated more efficiently.

Furthermore, the vehicle control device 10 is configured to acquire the target speed 116 in accordance with the width between the left and right border lines 112. Thus, if the width between the left and right border lines 112 is narrow, the vehicle control device 10 can set the target speed 116 for decreasing the travel speed of the host vehicle 11. Therefore, the vehicle occupant's anxiety can be reduced. In addition, by generating the predicted polygon target 111 for the moving object 202, the vehicle control device 10 can calculate the left and right recommended border lines 100 in accordance with the predicted polygon target 111. Thus, it is possible to favorably generate the route where the moving object 202 can be avoided.

Note that the present invention is not limited to the above embodiment, and can be changed variously in accordance with the concept of the invention. For example, the vehicle control device 10 may perform not only fully automated driving in which the travel control of the vehicle is fully automated but also partial automated driving (driving assistance) in which the travel control is partially automated. Examples of the driving assistance include a case where only the speed control is performed, a case where only the steering control is performed, and a case where the vehicle occupant performs the manual driving and the target speed and the target steering position are provided from an on-vehicle device such as a monitor or a speaker. In one example, the vehicle control device 10 may be configured to guide the appropriate route to the vehicle occupant by displaying the calculated recommended travel route 102 on the monitor of the host vehicle 11.

The invention claimed is:

1. A vehicle control device that performs travel control of a host vehicle at least partially automatically, the vehicle control device comprising one or more processors that execute computer-executable instructions stored in a memory, wherein the one or more processors execute the computer-executable instructions to cause the vehicle control device to:
   on a basis of detection information from a detector configured to detect a peripheral environment of a travel path where the host vehicle travels, extract left and right recognition lines on the travel path and extract a target that exists on the travel path; and
   calculate left and right border lines that express a range of action of the host vehicle and a limit of non-interference with the target in the travel path on a basis of information about the left and right recognition lines and the target, and calculate left and right recommended border lines during traveling of the host vehicle by adding an interval margin to each of the left and right border lines, the interval margin being added so as to narrow a width between the left and right border lines, wherein
   if an interval between the left and right recommended border lines in a width direction is less than or equal to a predetermined threshold, the one or more processors execute the computer-executable instructions to cause the vehicle control device to perform correction to move the left and right recommended border lines toward outside in the width direction,
   if a left recommended border line is positioned on a right side of a right recommended border line, the one or more processors execute the computer-executable instructions to cause the vehicle control device to move the left recommended border line to a left side of the right recommended border line in the correction.

2. The vehicle control device according to claim 1, wherein:
   the one or more processors execute the computer-executable instructions to cause the vehicle control device to generate left and right limit lines that are obtained by adding a deviation-allowing interval to each of the left and right recognition lines; and
   if one of the left and right recommended border lines overlaps with one of the left and right limit lines, move only another of the left and right recommended border lines toward the outside in the width direction in the correction.

3. The vehicle control device according to claim 1, wherein the one or more processors execute the computer-executable instructions to cause the vehicle control device to move the left and right recommended border lines toward the outside in the correction in a range in which the left and right recommended border lines do not go beyond the left and right border lines.

4. The vehicle control device according to claim 1, wherein the one or more processors execute the computer-executable instructions to cause the vehicle control device to calculate a width between the left and right border lines in a width direction and acquires, on a basis of reference information stored in a memory in advance, target speed that is in accordance with the width.

5. The vehicle control device according to claim 1, wherein before calculating the left and right border lines, the one or more processors execute the computer-executable instructions to cause the vehicle control device to classify an action for the target that has been extracted, into any one of left avoidance, right avoidance, stop, disregard, and following, and generates the left and right border lines on a basis of the classification of the left avoidance or the right avoidance.

6. The vehicle control device according to claim 1, wherein:
   one or more processors execute the computer-executable instructions to cause the vehicle control device to generate a polygon target on the basis of the information about the target; and
   if the target is a moving object, the one or more processors execute the computer-executable instructions to cause the vehicle control device to generate, as the polygon target, a predicted polygon target in which a position of the moving object changes as time elapses.

7. A vehicle control device that performs travel control of a host vehicle at least partially automatically, the vehicle control device comprising one or more processors that execute computer-executable instructions stored in a memory, wherein the one or more processors execute the computer-executable instructions to cause the vehicle control device to:
   on a basis of detection information a detector configured to detect a peripheral environment of a travel path where the host vehicle travels, extract left and right recognition lines on the travel path and extract a target that exists on the travel path; and
   calculate left and right border lines that express a range of action of the host vehicle and a limit of non-interference with the target in the travel path on a basis of information about the left and right recognition lines and the target, and calculate left and right recommended border lines during traveling of the host vehicle by adding an interval margin to each of the left and right border lines, the interval margin being added so as to narrow a width between the left and right border lines, wherein the one or more processors execute the computer-executable instructions to cause the vehicle control device to set restriction points where the host vehicle passes inside the left and right recommended border lines, and calculates a recommended travel route in which curvature, a travel distance, and a difference from a center of the left and right recommended border lines are minimized in a state where the restriction points are arranged, and adjust the left and right recommended border lines so that the recommended travel route is positioned on a center in a width direction.

* * * * *

UNITED STATES PATENT AND TRADEMARK OFFICE
CERTIFICATE OF CORRECTION

PATENT NO. : 11,136,027 B2
APPLICATION NO. : 16/616093
DATED : October 5, 2021
INVENTOR(S) : Kato et al.

It is certified that error appears in the above-identified patent and that said Letters Patent is hereby corrected as shown below:

In the Claims

Column 26:
Line 44, Claim 6 insert --the",-- before one or more.

Column 26:
Line 60, Claim 7 insert --from-- between information and a detector.

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*